US012602453B2

(12) United States Patent
Buffard et al.

(10) Patent No.: US 12,602,453 B2
(45) Date of Patent: Apr. 14, 2026

(54) MEDIA AUTHENTICATION

(71) Applicant: Nagravision Sàrl,
Cheseaux-sur-Lausanne (CH)

(72) Inventors: Christophe Buffard, Phoenix, AZ
(US); Laura Buffard, Phoenix, AZ
(US)

(73) Assignee: NAGRAVISION SÀRL,
Cheseaux-sur-Lausanne (CH)

( * ) Notice: Subject to any disclaimer, the term of this
patent is extended or adjusted under 35
U.S.C. 154(b) by 226 days.

(21) Appl. No.: 18/042,878

(22) PCT Filed: Aug. 31, 2021

(86) PCT No.: PCT/EP2021/073967
§ 371 (c)(1),
(2) Date: Feb. 24, 2023

(87) PCT Pub. No.: WO2022/049053
PCT Pub. Date: Mar. 10, 2022

(65) Prior Publication Data
US 2023/0325473 A1     Oct. 12, 2023

Related U.S. Application Data

(60) Provisional application No. 63/073,294, filed on Sep.
1, 2020.

(51) Int. Cl.
*G06F 21/10*          (2013.01)
*H04L 9/32*           (2006.01)

(52) U.S. Cl.
CPC ............ *G06F 21/10* (2013.01); *H04L 9/3239*
(2013.01); *G06F 21/1086* (2023.08)

(58) Field of Classification Search
None
See application file for complete search history.

(56) References Cited

U.S. PATENT DOCUMENTS 9,392,279 B2 * 7/2016 Dziecielewski ..... H04N 19/513
10,536,278 B1   1/2020 Donaldson et al.
(Continued)

FOREIGN PATENT DOCUMENTS

CN     111917558 B  *  3/2021
WO     2019196696      10/2019
WO     2022049057       3/2022

OTHER PUBLICATIONS

Ait Sadi, K., Guessoum, A., Bouridane, A., & Khelifi, F. (2016).
Content fragile watermarking for H.264/AVC video authentication.
International Journal of Electronics, 104(4), 673-691. https://doi.
org/10.1080/00207217.2016.1242163 (Year: 2016).*

(Continued)

*Primary Examiner* — Rupal Dharia
*Assistant Examiner* — Shadi H Kobrosli
(74) *Attorney, Agent, or Firm* — Maier & Maier, PLLC

(57)          ABSTRACT

A content owner registers with an identity authority by
providing information about the content owner and a public
key of a public/private key pair. The content owner registers
content to the identity authority and signs the multiple
segments of the content with the private key of the public/
private key pair. A system that receives the signed content
determines an indicated content owner of the received media
content and communicates with the identity authority to
confirm that the media content was produced by the indi-
cated content owner. The receiving system requests the
public key of the content owner from the identity authority
and uses the public key to verify the signature of each media
content segment. Accordingly, the receiving system is able
to determine if the media content was manipulated after
being distributed by the content owner.

19 Claims, 14 Drawing Sheets

(56) References Cited

U.S. PATENT DOCUMENTS

| | | | |
|---|---|---|---|
| 10,602,202 B1 | 3/2020 | Taylor et al. | |
| 11,770,260 B1 * | 9/2023 | Pamucci | H04N 21/8358 |
| 2003/0009670 A1 * | 1/2003 | Rhoads | H04N 21/8358 |
| | | | 713/176 |
| 2004/0022523 A1 * | 2/2004 | Duerr | H04N 5/765 |
| | | | 360/60 |
| 2011/0243458 A1 * | 10/2011 | Yoshioka | G09C 5/00 |
| | | | 382/209 |
| 2012/0023541 A1 * | 1/2012 | Wiener | H04N 7/147 |
| | | | 725/118 |
| 2012/0134529 A1 * | 5/2012 | Vazquez | H04N 21/8455 |
| | | | 382/100 |
| 2013/0259228 A1 * | 10/2013 | Ren | H04L 9/3236 |
| | | | 380/200 |
| 2015/0033023 A1 | 1/2015 | Xu et al. | |
| 2015/0334339 A1 * | 11/2015 | Dejene | H04N 5/76 |
| | | | 705/309 |
| 2016/0197939 A1 | 7/2016 | Wang et al. | |
| 2017/0134161 A1 | 5/2017 | Goeringer et al. | |
| 2017/0206523 A1 | 7/2017 | Goeringer et al. | |
| 2018/0253567 A1 * | 9/2018 | Gonzalez-Banos | |
| | | | H04N 21/8358 |
| 2020/0267404 A1 * | 8/2020 | Levy | H04N 21/8358 |

OTHER PUBLICATIONS

Nandakishore Ramaswamy and K. R. Rao. 2006. Video authentication for H.264/AVC using digital signature standard and secure hash algorithm. In Proceedings of the 2006 international workshop on Network and operating systems support for digital audio and video (Nossdav '06). (Year: 2006).*

K. A. Saadi, A. Bouridane and A. Gessoum, "H.264/AVC video authentication based video content," 2010 5th International Symposium on I/V Communications and Mobile Network, Rabat, Morocco, 2010, pp. 1-4, doi: 10.1109/ISVC.2010.5656206. (Year: 2010).*

X. Zhu and C. W. Chen, "A Joint Source-Channel Adaptive Scheme for Wireless H.264/AVC Video Authentication," in IEEE Transactions on Information Forensics and Security, vol. 11, No. 1, pp. 141-153, Jan. 2016, doi: 10.1109/TIFS.2015.2481366. (Year: 2016).*

"Mikey: Multimedia Internet KEYing Memo", The Internet Society, Network Working Group, Request for Comments: 3830, (Aug. 2004), 66 pgs.

"Mikey-Ticket: Ticket-Based Modes of Key Distribution in Multimedia Internet KEYing (Mikey)", Internet Engineering Task Force (IETF), Request for Comments: 6043, (Mar. 2011), 58 pgs.

"International Application Serial No. PCT EP2021 073967, International Search Report mailed Dec. 14, 2021", 7 pgs.

"International Application Serial No. PCT EP2021 073967, Written Opinion mailed Dec. 14, 2021", 5 pgs.

Ait, Saadi K, "H.264 AVC video authentication based video content", I V Communications and Mobile Network (ISVC), 2010 5th International Symposium on, IEEE, Piscataway, NJ, USA, (Sep. 30, 2010), 1-4.

Ait, Saadi K, "Combined Fragile Watermark and Digital Signature for H.264 AVC Video Authentification", 17th European Signal Processing Conference; Aug. 24-28, 2009; Glasgow, Scotland, (Aug. 24, 2009), 1799-1803.

* cited by examiner

140

CONTENT ACCESS DEVICE

210

NETWORK INTERFACE

220

MEDIA CONTENT PROCESSING MODULE

230

CONTENT AUTHENTICATION MODULE

240

CONTENT AUTHENTICATION ALERT MODULE

250

CONTENT AUTHENTICATION PREFERENCE DATA STORAGE

260

MEDIA CONTENT DATA STORAGE

270

USER INTERFACE MODULE

500

510A

GROUP OF PICTURES

| 520A | 530A | 540A | 550A | 560A |
| --- | --- | --- | --- | --- |
| IDR FRAME | P FRAME | P FRAME | B FRAME | P FRAME |

570A

580A   VIDEO CODING LAYER

EMBEDDED DATA

510B

GROUP OF PICTURES

| 520B | 530B | 540B |
| --- | --- | --- |
| IDR FRAME | P FRAME | P FRAME |

570B

580B   VIDEO CODING LAYER

EMBEDDED DATA

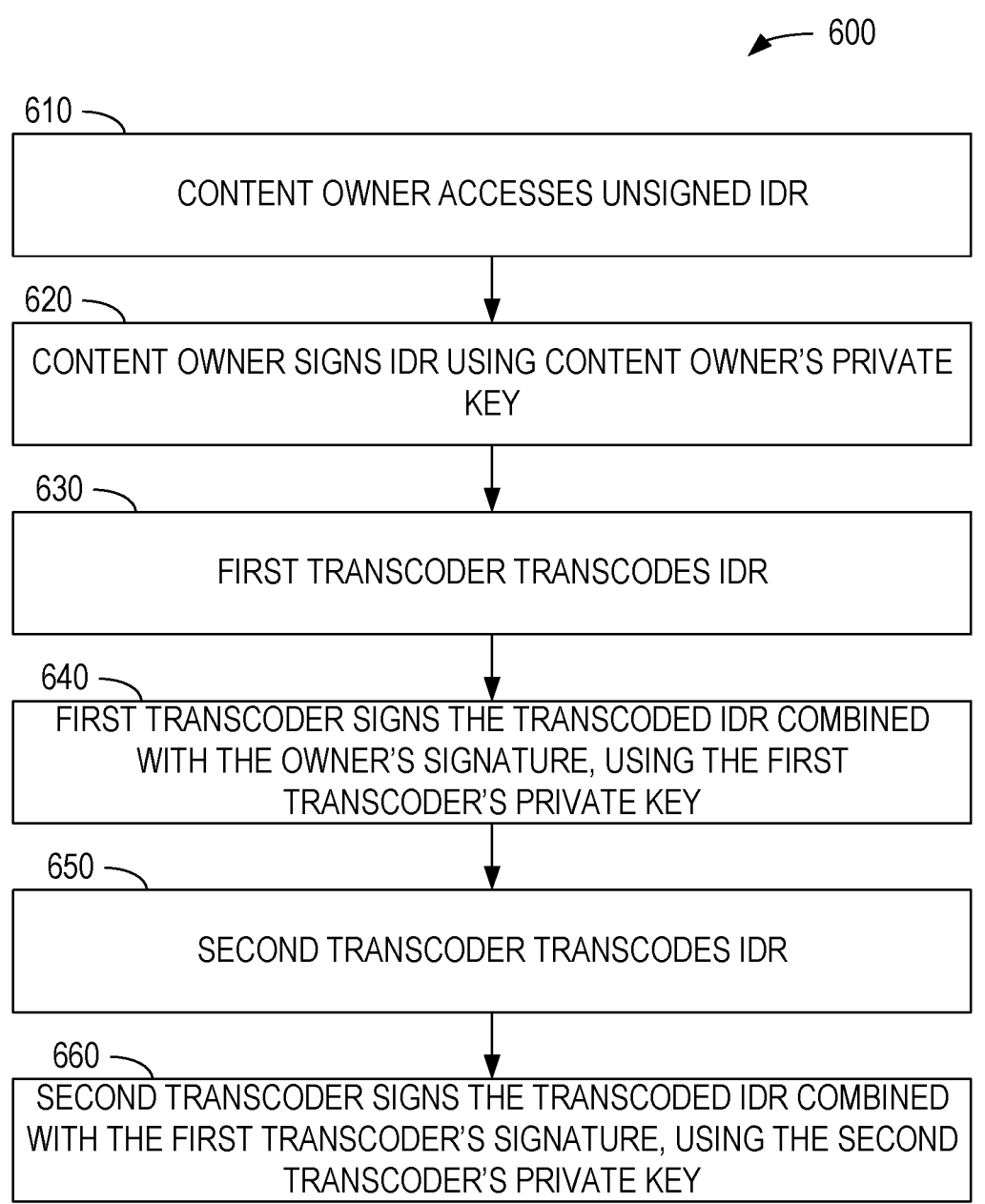

600

610
CONTENT OWNER ACCESSES UNSIGNED IDR

620
CONTENT OWNER SIGNS IDR USING CONTENT OWNER'S PRIVATE KEY

630
FIRST TRANSCODER TRANSCODES IDR

640
FIRST TRANSCODER SIGNS THE TRANSCODED IDR COMBINED WITH THE OWNER'S SIGNATURE, USING THE FIRST TRANSCODER'S PRIVATE KEY

650
SECOND TRANSCODER TRANSCODES IDR

660
SECOND TRANSCODER SIGNS THE TRANSCODED IDR COMBINED WITH THE FIRST TRANSCODER'S SIGNATURE, USING THE SECOND TRANSCODER'S PRIVATE KEY

FIG. 6

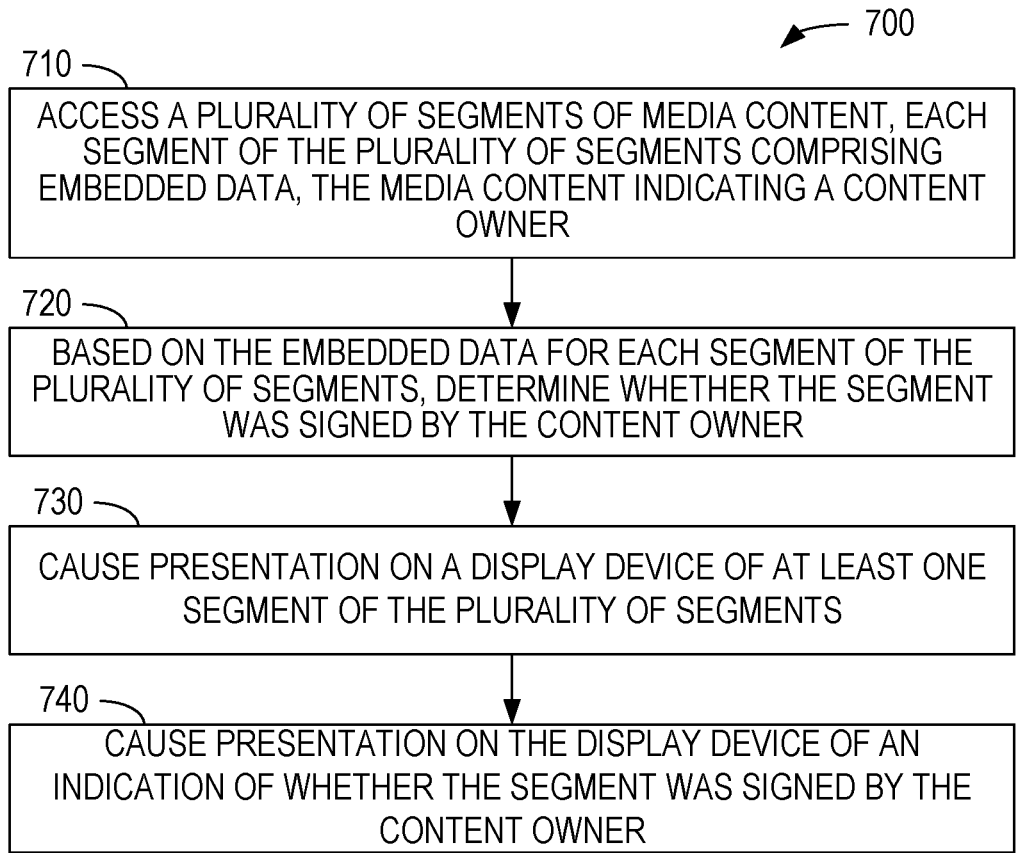

710 —
ACCESS A PLURALITY OF SEGMENTS OF MEDIA CONTENT, EACH SEGMENT OF THE PLURALITY OF SEGMENTS COMPRISING EMBEDDED DATA, THE MEDIA CONTENT INDICATING A CONTENT OWNER

720 —
BASED ON THE EMBEDDED DATA FOR EACH SEGMENT OF THE PLURALITY OF SEGMENTS, DETERMINE WHETHER THE SEGMENT WAS SIGNED BY THE CONTENT OWNER

730 —
CAUSE PRESENTATION ON A DISPLAY DEVICE OF AT LEAST ONE SEGMENT OF THE PLURALITY OF SEGMENTS

740 —
CAUSE PRESENTATION ON THE DISPLAY DEVICE OF AN INDICATION OF WHETHER THE SEGMENT WAS SIGNED BY THE CONTENT OWNER

ACCESS A PLURALITY OF SEGMENTS OF MEDIA CONTENT

820 ─╮

SIGN EACH SEGMENT OF THE PLURALITY OF SEGMENTS

830 ─╮

TRANSMIT AN IDENTIFIER OF THE MEDIA CONTENT, AN IDENTIFIER OF AN OWNER OF THE MEDIA CONTENT, AND ZERO OR MORE AUTHORIZATIONS FOR MODIFICATION OF THE MEDIA CONTENT TO A SERVER

800

1000

1010

(DISPLAYED CONTENT OF MEDIA CONTENT ITEM)

1020

UNAUTHORIZED MODIFICATIONS TO NBS CONTENT PRESENT

1200

1210

(DISPLAYED CONTENT OF MEDIA CONTENT ITEM)

1220

CONTENT CREATED BY NBS, AUTHORIZED MODIFICATIONS BY XYZ

MEDIA AUTHENTICATION

PRIORITY CLAIM

This application U.S. National Stage filing under 35 U.S.C. § 371 of PCT Patent Application No. PCT/EP2021/073967, entitled "Media Authentication" and filed on Aug. 31, 2021, which claims priority to U.S. Provisional Patent Application No. 63/073,294, entitled "Media Authentication" and filed on Sep. 1, 2020, which are hereby incorporated by reference in their entirety.

FIELD

The embodiments discussed herein are related to authentication of media content items. In some embodiments, a media content item includes embedded signature data, allowing a recipient of the media content to verify that the media content item has not been altered or to detect that the media content item has been altered.

BACKGROUND

Ongoing improvements to media creation and editing technology allows malevolent actors to manipulate media content items in harmful ways. For example, video and audio of a person speaking may be manipulated to make it appear as though the person said something that they did not say.

BRIEF DESCRIPTION OF THE DRAWINGS

Example embodiments will be described and explained with additional specificity and detail through the use of the accompanying drawings.

FIG. 6 is a flowchart illustrating operations of a method suitable for implementing media authentication, according to some example embodiments.

FIG. 7 is a flowchart illustrating operations of a method suitable for implementing media authentication, according to some example embodiments.

DETAILED DESCRIPTION OF THE DRAWINGS

Figure 1:
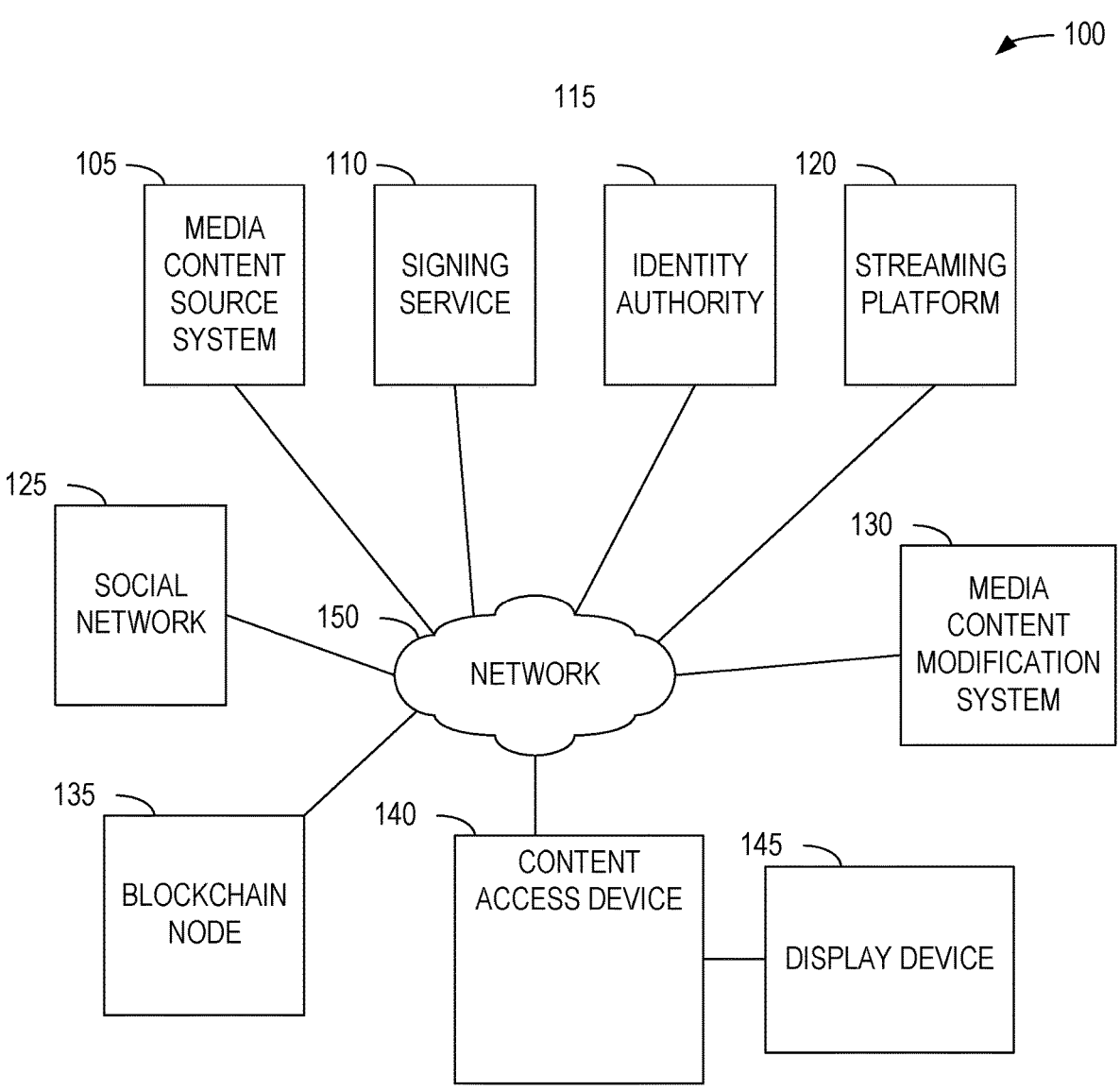
FIG. 1 is a network diagram illustrating a network environment suitable for implementing media authentication, according to some example embodiments.

Aspects of the disclosure provide systems and methods to authenticate media. A content owner may register with an identity authority by providing information about the content owner and a public key of a public/private key pair (e.g., using Public Key Infrastructure (PKI)). As used herein, "content owner" refers to an entity (e.g., a company, a business unit, an individual, a computer system, or any combination thereof) that controls distribution of a media content item. A content owner may be a content creator that creates the media content item, a content producer that causes (e.g., via a contract) a content creator to create the media content item or acquires ownership of the media content item after creation, or any suitable combination thereof. As used here, the "content owner" of a media content item is not necessarily the copyright holder of the media content item.

The content owner registers a media content item with the identity authority and signs the content with the private key of the public/private key pair. The signing may be performed by a system of the content owner or by a signing service. A signing service verifies the identity of the content owner using the identity authority and signs the content. The signing service may incorporate data received from the identity authority (e.g., distribution rights granted by the content owner) into the signature.

A media content item comprises one or more of audio content and video content. A media content item may include additional content, such as text content, motion content, alternative audio or video content, or any suitable combination thereof.

The signing of the media content item includes signing multiple segments of the media content item. For example, each instantaneous decoder refresh (IDR) frame of the media content item or the video coding layer (VCL) of each segment may have a signature embedded in it, the signature being of the segment of the media content item beginning with the IDR frame and ending at the frame immediately preceding the next IDR frame. An IDR frame is a frame of a media content item that can be displayed without reference to any other frames of the media content item. Additionally, all frames following an IDR frame can be decoded and displayed without reference to any frames before the IDR frame.

Signed content is provided to a delivery network (e.g., a signed delivery network (CDN)) for distribution to a delivery platform (e.g., a social network) or to a client-side application. The receiving system determines a content owner identified based on data embedded in the received media content item and communicates with the identity authority to confirm that the media content item was produced by the indicated content owner. The receiving system requests the public key of the content owner from the identity authority and uses the public key to verify the signature of each segment of the media content item.

Verification of the digital signature of a segment of a media content item will not be successful if the segment was signed using a different private key (e.g., the private key of another content owner) or if the segment was changed after signature (e.g., by being manipulated). Accordingly, as long as the correct private key is used, the receiving system is able to determine if the media content item was manipulated after being distributed by the content owner. The media content item may be played using a local or network application and the status (e.g., verified, modified, or unsigned) of each segment of the media content item may be displayed on a user interface.

In some example embodiments, each segment is signed with multiple signatures, each signature corresponding to a different aspect of the segment. In these embodiments, detection of modification of the segment may be more detailed and indicate a specific aspect that was modified. For example, video, audio, and text aspects of a media segment may be signed individually. Thus, if only the audio of the media segment is modified, the video and text signatures will be verified successfully but the modification of the audio will be detected. With only a single signature for the segment, the modification would be detected, but the receiving device would not be able to determine which aspect was modified.

By use of the systems and methods described herein, segment-level media authentication is provided. This provides increased security relative to prior-art systems in which entire media content items were signed (e.g., an entire movie or television broadcast). In these prior-art systems, taking a clip of a media content item would be detected as a modification, but this is of limited use, since the use of video clips in reporting or for sharing on social media is a common practice. As a result, a user who already knew that the media content item had been modified by taking a clip of the media content item, could not be further informed as to whether the clip itself had been modified. Using the systems and methods described herein, the technological system for media authentication is improved, as the resulting system is more useful to the user than were prior-art systems. Additionally, by providing media authentication, the systems and methods described herein may reduce the amount of time taken by a user in determining whether a media content item is accurate, reduce the use of other applications by the user in gathering information regarding the media content item, or both. This system enables users to determine that the media is not its original form, therefore the modified media content item may be used for spreading misinformation, may present only a fraction of the complete picture, or both.

FIG. 1 is a network diagram illustrating a network environment 100 suitable for implementing media authentication, according to some example embodiments. The network environment 100 includes a media content source system 105, a signing service 110, an identity authority 115, a streaming platform 120, a social network 125, a media content modification system 130, a blockchain node 135, a content access device 140, a display device 145, and a network 150. The media content source system 105 produces media content items. Example media content item producers include broadcast television stations, cable television stations, streaming services that produce original content, Internet-based content producers, governments, and individuals. The identity authority 115 (e.g., a server providing an identity service) receives identity registration information from the media content source system 105 and provides at least a portion of that information to other systems that request the information. The signing service 110 signs the produced media content item on behalf of the media content source system 105 (e.g., by using a private key of the media content source system 105). The media content source system provides the signed media content item to the streaming platform 120, the social network 125, the media content modification system 130, or the content access device 140. Any of the systems receiving the media content item can verify the identity of the content owner using data embedded in the signed media content item and a public key of the media content source system 105 (e.g., a public key retrieved from the identity authority 115).

Individual recording devices may be associated with unique public/private key pairs. The private key may be embedded within the recording device in a way that makes it difficult or impossible to extract the key from the recording device, ensuring that no other device is capable of signing recordings with the device's private key. Thus, identification of the specific recording device may be determined based on the signature by the recording device. In some example embodiments, a recording device records content for multiple content producers, a content producer uses multiple recording devices, or both. Thus, content may be signed by both the recording device and the content producer to allow determination of each. Alternatively or additionally, a database or blockchain entry may store a one-to-many relationship of a content producer to multiple devices.

The device-specific degree of granularity is useful to ensure that media content used as legal evidence has not been modified since capture. For example, a police officer's bodycam footage, a vehicle's dashcam footage, a homeowner's security camera footage all may be admissible as legal evidence if it can be proved that the video was not modified after being taken. The signed data may include timestamp information and geolocation data, further increasing confidence that the media content item is accurate.

In another example embodiment, the recording device is used in a video conference. Thus, other participants in the video conference are enabled to determine the source device of a participant's video. If the source device is registered with the identity authority 115 or the blockchain 135, the video is accepted. Otherwise, the connection may be rejected, a warning may be shown, or both. In this way, even using deepfake technology, an imposter may be detected and the security of the video conference protected.

In still another example embodiment, sensor data (e.g., from a video camera) is signed by the sensor before being provided to a self-driving car, airplane auto-pilot, or autonomous drone for use in controlling the vehicle. Without the signature, the receiving processor may be fooled by injected data, possibly causing a crash of the vehicle. With the signature, the receiving processor is enabled to determine when fraudulent data is received and to take appropriate action (e.g., to turn over control to a human operator or to stop the vehicle).

The media content modification system 130 may make authorized or unauthorized modifications to the media content item. To make authorized modifications, the media content modification system 130 requests, from the identity authority 115, data provided by the media content source system 105 that indicates what types of modifications are permitted. Alternatively, the rules allowing or disallowing modification may be indicated in the content metadata. For example, permission may be granted to cut the media content item into clips with a minimum length of 30 seconds, permission may be granted to add subtitles, or other permissions may be granted. Another example permission identifies a frame in the media content item and allows clips to be taken that include the frame only if they also include a predetermined duration (e.g., 5 seconds) of the media content item before the frame, a predetermined duration (e.g., 10 seconds) of the media content after the frame, or both. For example, a news item may include a portion that could be taken out of context, such as a person returning an insult in an argument. To ensure that the portion is presented in context, the permission to take a clip including the portion is granted only if the clip also includes another portion that provides the context.

In some example embodiments, permissions may be associated with a time period. For example, prior to a public release of a media content item (e.g., a movie), no permissions may be granted, but after the media content item is released, permission to transcode portions between 30 and 60 seconds in length may be granted. Thus, in some example embodiments, the registration of the content item includes a first set of permissions initially applicable, a transition date, and a second set of permissions applicable after the transition date.

Another example permission controls modification of the frame rate. For example, altering one portion of the media content item to present video in slow motion (e.g., by reducing the frame rate by a factor of two) without altering other portions of the media content may be misleading. Thus, permission to modify the frame rate of a clip of a media content item may be granted only if the entire clip is presented at the same frame rate.

The media content modification system 130 makes authorized modifications and, using the identity authority 115 and the signing service 110, signs the modified media content item. The modified media content item is provided to the streaming platform 120, the social network 125, the media content modification system 130, or the content access device 140. Any of the systems receiving the modified media content item can verify the identity of the media content modification system 130, the media content source system 105, and that the modifications were authorized using data embedded in the modified media content item, a public key of the media content modification system 130, and a public key of the media content source system 105.

The identity authority 115 may be implemented by a decentralized system that includes or implements a distributed ledger system (e.g., a blockchain) that manages identities of content owners and modifiers, registration of media content items and modifications authorized by the producers of the media content items, and verification of media content items. In some example embodiments, the identity authority 115 makes use of protocols discussed in Internet Engineering Task Force (IETF) Request for Comments (RFC) 3830, "MIKEY: Multimedia Internet KEYing" or IETF RFC 6043, "MIKEY-TICKET: Ticket-Based Modes of Key Distribution in Multimedia Internet KEYing (MIKEY)." Additionally or alternatively, the identity authority may act as a Certificate Authority (CA) making use of X.509 certificates, as defined by the International Telecommunication Union Telecommunication Standardization Sector (ITU-T).

The role of the identity authority 115 may also be achieved through the use of a blockchain with nodes operated by large and reputable content owners, such as broadcasters, news corporations, or media corporations. Consensus may be determined by mining (e.g., validated by proof of work) or another consensus protocol (e.g., validated by proof of stake). A content owner may generate a certificate for each content item, sign the certificate, and add the signed certificate to the blockchain. The certificate may identify one or more authorized transcoding nodes (e.g., a passlist of systems or entities that are permitted to make modifications, a banlist of systems or entities that are not permitted to make modifications, or both). Authorized transcoding nodes may generate a certificate for a modified content item, sign the certificate, and add the signed certificate to the blockchain. A recipient of a media content item signed by the content owner or the authorized transcoding node can access the corresponding certificate from the blockchain and verify the validity of the signature. Modifications by nodes other than authorized transcoding nodes are detected, even if signed, due to the lack of an identifier of the unauthorized transcoding node in the certificate provided by the content owner.

The content owner may add a transaction to the blockchain that adds or removes transcoding nodes from the list of authorized transcoding nodes. In some example embodiments, the addition or removal of the transcoding node is retroactive. In other example embodiments, the addition or removal of the transcoding node applies only after the transaction is added to the blockchain. The content owner may sign the public keys of the authorized third parties and embed the signed keys in the certificate or otherwise in the blockchain. Thus, a recipient can decrypt the authorized public keys using the content owner's public key and then verify that a modified version of the content was signed by an authorized transcoding node.

The signing service 110 identifies each segment of the media content item to be signed. For example, the media content item may be in the form of moving picture experts group (MPEG)-4 file and the IDR frames of the MPEG-4 file may be detected and handled as the first frame of each segment. The signing service 110 signs each segment and embeds the signature in the segment (e.g., using supplemental enhancement information (SEI) messages defined by the International Organization for Standardization (ISO)/International Electrotechnical Commission (IEC) standard 14496-10, Advanced Video Coding). For example, a hash value of the IDR frame may be generated, signed using a private key of the content owner, and embedded in the IDR. As another example, the IDR and other data in the video coding layer (VCL), such as the coded slice data partitions A, B, and C, may be hashed, signed, and embedded. As still another example, image region or motion vectors of frames dependent on the IDR frame may be signed, allowing for detection of modification of these components of the video data. A sequence number or timestamp of the segment may be included in the data being hashed, allowing verification that segments have not been reordered.

The signing service 110 may sign audio data instead of or in addition to the video data. For example, a hash may be taken of an MPEG-2 Audio Layer III (MP3) audio track for the segment. As described above, the hash may be signed and embedded in the segment. In some example embodiments, the hash of the video content and the hash of the audio content are combined, allowing detection of modification of either audio or video data but not a determination of which was modified. In some example embodiments, the two signed hashes are stored separately, allowing for separate verification. The separate and combined signatures may all be embedded in the segment, preventing an audio track and its corresponding signature from being moved into a different video track without detection while still allowing identification of modification of either the video content or the audio content separately.

In some example embodiments, the video content of all segments is signed, but audio content of fewer than all segments is signed. For example, the content owner may indicate a fraction of the segments to include audio content signatures (e.g., by identifying particular segments, by defining a number of segments to skip between signatures, or any suitable combination thereof) and the signing service 110 may sign the audio of segments in accordance with the indicated fraction.

The content access device 140 receives the original or modified media content item and plays it on the display device 145 (e.g., on a display device connected to or integrated with the content access device 140). The content access device 140 may determine the creator of the media content item, whether the media content item was modified, whether any modification was authorized, what kind of modification was made, or any suitable combination thereof. The determined information about the media content item may be used to determine whether to allow playback of the media content item, display an informational message about the media content item, display the contents of the information message, or any suitable combination thereof.

For example, if permissions were granted by the content owner related to the duration of clips, the content access device 140 can check the duration of a clip received with the permitted duration and refuse to play a non-conforming clip, present a user interface element that indicates that the clip does not conform with the content owner's permissions, inform the content owner that an unpermitted modification was made, or any suitable combination thereof.

In some example embodiments, in addition to or instead of using the centralized signing service 110, the centralized identity authority 115, or both, blockchain technology is used for identification and signing of media content items. The tasks of maintaining and verifying the blockchain are divided among blockchain nodes, such as the blockchain node 135.

As described above, the media content source system 105 signs the content. In some example embodiments, the media content source system 105 also signs metadata for the content. For example, a proof of purchase of a media content item may be included with the media content item by signing data describing the purchase (e.g., an identifier of the media content item, an identifier of the content producer of the media content item, a content distribution network 305 through which the media content item was purchased, a date and time on which the media content item was purchased, an identifier of the purchaser of the media content item, an identifier of a transaction comprising the purchase, or any suitable combination thereof) using the private key of the media content source system 105.

When a user attempts to play the media content item, the device can use a public key of the media content source system 105 to verify that the signed metadata was not modified. Thus, digital rights management (DRM) may be implemented by configuring the device to refuse to play media content items that do not include signed purchase data, include purchase data that indicates that the media content items were not purchased by a user associated with the device, include purchase data that was modified after being signed, or any suitable combination thereof. Additionally or alternatively, the device may detect any of these conditions and display an alert to a user, send a notification to the media content source system 105, send a notification to the content distribution network 305, send a notification to the centralized identity authority 115, or any suitable combination thereof.

The purchase data may be used by law enforcement to determine ownership of contested digital goods, by the content distribution network 305 to determine if a refund may be issued, by a customer rewards system to determine that the customer purchased the media content item, or any suitable combination thereof.

The media content source system 105 may use a different public/private key pair for each transaction. The keys are registered with the centralized identity authority 115 and available for use just as the single key for the media content source system 105 described above. A database tracks the relationship between each key pair and the corresponding transaction. Thus, usage data and dissemination data are available to provide tracking of each individual copy of each media content item.

Rather than registering each key for each transaction with the centralized identity authority 115, the transaction key may be embedded in the media content item and signed by the registered key for the media content source system 105. A database stores the relationship between transaction keys and transaction data (e.g., the purchaser in the transaction, the date of the transaction, whether a refund has been issued on the transaction, or any suitable combination thereof).

The media content source system 105, the signing service 110, the identity authority 115, the streaming platform 120, the social network 125, the media content notification system 130, the blockchain node 135, and the content access device 140 may each be implemented in a computer system, in whole or in part, as described below with respect to FIG. 14.

Any of the machines or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 14. Any or all of the devices 105-145 may include a database or be in communication with a database server that provides access to a database. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The media content source system 105, the signing service 110, the identity authority 115, the streaming platform 120, the social network 125, the media content modification system 130, the blockchain node 135, and the content access device 140 may be connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

In some example embodiments, the content access device 140 is a set-top box that provides audio-visual signals to a television and interacts with a user via a remote control. For example, the set-top box may cause a user interface (e.g., a menu) to be displayed on the television and the user can interact with the menu by pressing directional inputs and other inputs on the remote control (e.g., select, back, alphanumeric characters, or any suitable combination thereof). Additionally or alternatively, the set-top box may be controlled by a smart device (e.g., a smartphone, a tablet, or a wearable device) comprising a display. In these embodiments, the available inputs may be presented to the user of the smart device in a second user interface.

Figure 2:
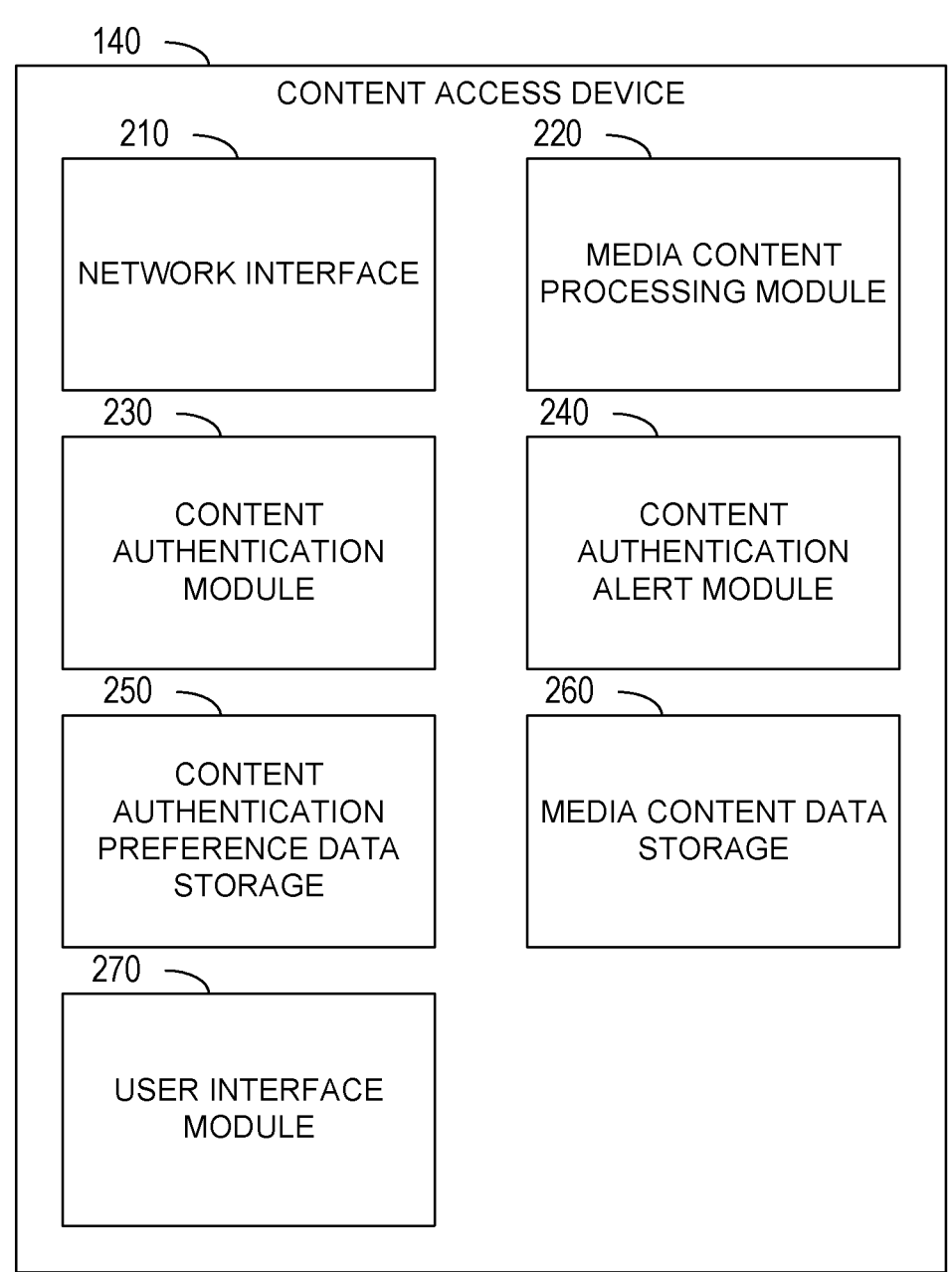
FIG. 2 is a block diagram of a content access device, according to some example embodiments, suitable for implementing media authentication.

FIG. 2 is a block diagram 200 of the content access device 140, according to some example embodiments, suitable for implementing media authentication. The content access device 140 is shown as including a network interface 210, a media content processing module 220, a content authorization module 230, a content authentication alert module 240, a content authentication preference data storage 250, media content data storage 260, and a user interface module 270, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The network interface 210 receives data sent to the content access device 140 and transmits data from the content access device 140. For example, the network interface 210 may receive, from the streaming platform 120, a media content item for display on the display device 145. Communications sent and received by the network interface 210 may be intermediated by the network 150.

The media content processing module 220 processes received media content items. For example, compressed media may be decompressed by the media content processing module 220 for playback.

The received media content item may be authenticated by the content authentication module 230. For example, the content authentication module 230 may access authentication data embedded in the media content item and, based on the authentication data, request data from the identity authority 115 to confirm that the authorship data embedded in the media content item matches authorship data registered with the identity authority 115.

The content authentication alert module 240 generates an alert when a media content item cannot be authenticated. For example, a media content item may lack ownership data, either because it was created without the ownership data or because a third party deleted the data. As another example, a media content item may include embedded data that indicates that the media content item was signed by a particular content owner, but the identity authority 115 may indicate that the content owner has not registered ownership of the media content item. As yet another example, the identity authority 115 may confirm that the indicated author did author the media content item, but the signed hash does not match a hash generated from the media content item, indicating that the content item has been modified after creation. The alert may be displayed while the media content item is being played for the user, displayed in place of playing the media content item, communicated separately from play of the media content item (e.g., in an email, text message, alert on a smart device, or any suitable combination thereof), or any suitable combination thereof.

The content access device 140 may store user preferences in the content authentication preference data storage 250. For example, a user may configure the content authentication alert module to generate alerts if signed media content items cannot be verified and not to generate alerts if unsigned media content items are played. As another example, a user may configure the user interface module 270 to refuse to play unsigned media content items. These user preferences and others may be stored for persistent access across sessions.

The media content data storage 260 stores media content items. For example, streaming video content may be buffered in the media content data storage 260 and deleted after playback. As another example, the user may store a library of media content items for later playback in the media content data storage 260.

The user interface module 270 generates a user interface for display on the display device 145. For example, a web browser implementation of the user interface module 270 receives web content (e.g., hypertext markup language (HTML) files, JavaScript files, cascading style sheets (CSS) data, or any suitable combination thereof) and generates a user interface based on the web content. A portion of the user interface may be used to display media content items, to display information regarding the media content items (e.g., whether the creator of a media content item could be authenticated), or any suitable combination thereof. For example, any of the user interfaces of FIGS. 9-12 may be presented. The user interface module 270 also receives user input via the presented user interface. For example, configuration options and playback commands (e.g., play, stop, fast-forward, or rewind) may be received via the user interface module 270.

Figure 3:
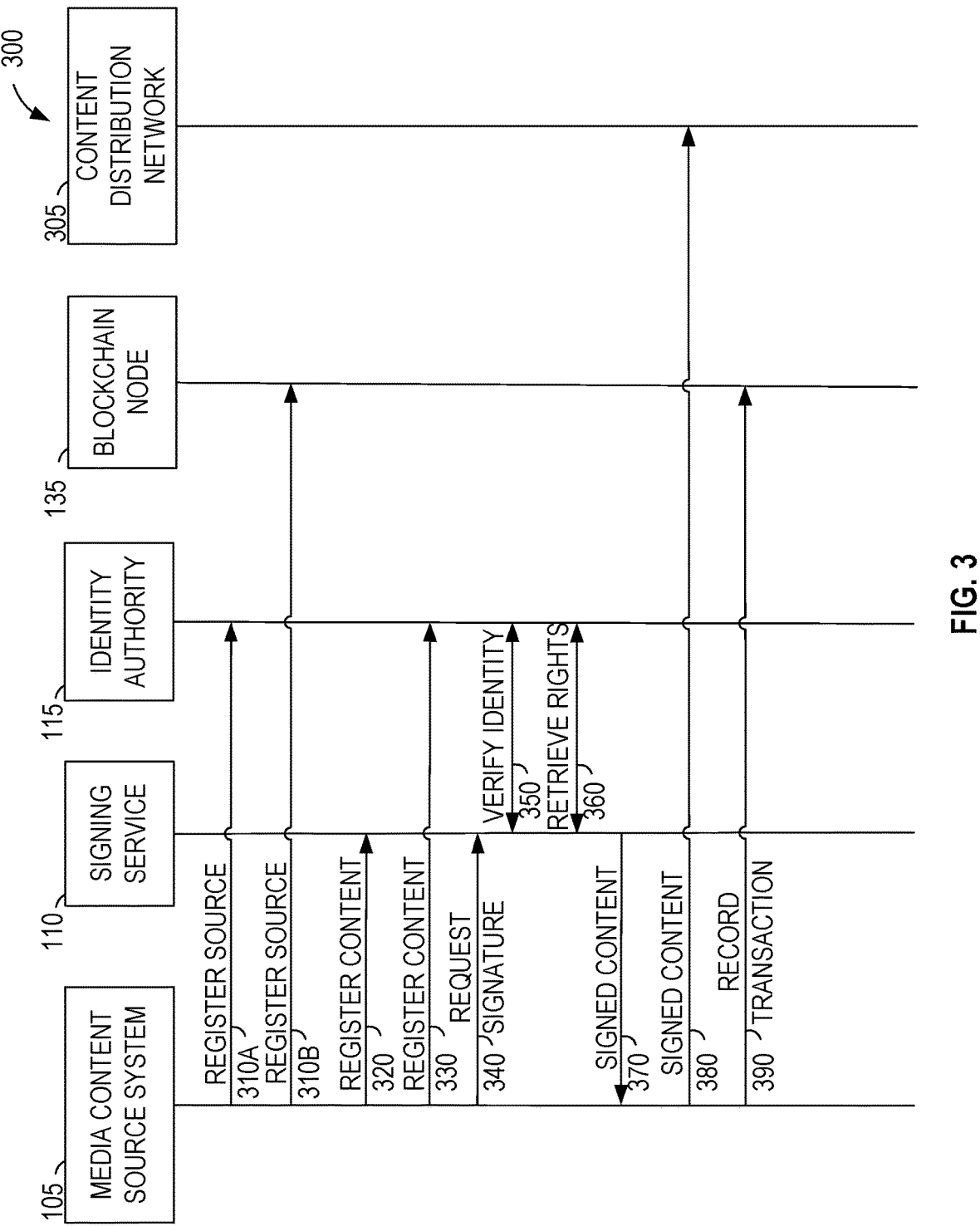
FIG. 3 is a swimlane diagram showing communications among systems, according to some example embodiments, suitable for implementing media authentication.

FIG. 3 is a swimlane diagram 300 showing communications among systems, according to some example embodiments, suitable for implementing media authentication. The swimlane diagram 300 shows communications 310A, 310B, 320, 330, 340, 350, 360, 370, 380, and 390 among the media content source system 105, the signing service 110, the identity authority 115, the blockchain node 135, and the content distribution network 305.

The media content source system 105 registers itself as a source of content either in communication 310A with the central identity authority 115 or in communication 310B with the decentralized blockchain node 135. The registration communication 310A or 310B includes a public key of the media content source system 105. Once registered, the identity authority 115 or the blockchain that is modified by the blockchain node 135 will provide the registered public key to others. Thus, the content distribution network 305, the streaming platform 120, or the content access device 140 will be able to access the public key of the media content source system 105. Using the public key, other systems will be able to determine if media content items were signed by the media content source system 105 (or the signing service 110 on behalf of the media content source system 105) using a private key of the media content source system 105.

In the example discussed above, the media content source system 105 generates the public key/private key pair and provides the public key to the identity authority 115 or the decentralized blockchain node 135. In other example embodiments, the identity authority 115 generates the public key/private key pair and provides the private key to the media content source system 105.

In some example embodiments, the private key used to sign a media content item is a unique key for the media content item. For example, a new public key/private key pair may be generated for each media content item and registered with the identity authority 115. As another example, the hash of the content may be encrypted using the private key of a new public key/private key pair and the new public key may be encrypted using the private key of the media content source system 105. A recipient of the media content item requests the public key of the media content source system from the identity authority 115, uses the received public key to decrypt the (new) public key for the media content item, and uses the (new) public key to decrypt the hash of the content.

In communication 320, the media content source system 105 registers a media content item to the signing service 110. The communication 320 includes the private key of the media content source system 105. The signing service may store a local copy of the media content item, the private key, or both for later use.

The media content source system 105, in communication 330, registers the media content item to the identity authority 115. Thus, the identity authority 115 is enabled to update its records (e.g., in a database) to be able to indicate to others that the media content source system 105 has asserted authorship of the media content item. The registration communication 310A or the register content communication 330 may include information about the rights that the media content source system 105 grants or denies others in the media content item.

The signing service 110, in response to the request signature communication 340 from the media content source system 105, will sign the media content item using the private key of the media content source system. However, to reduce the risk of fraud, the signing service 110 engages in communication 350 with the identity authority 115 to verify the identity of the media content source system 105. For example, the signing service 110 may request (and receive) the public key of the media content source system 105 from the identity authority 115. The signing service 110 can verify that the private key provided by the media content source system 105 is the matching pair to the public key stored at the identity authority 115, thus confirming the identity of the media content source system 105.

Additionally, the signing service 110 may retrieve, from the identity authority 115, the rights for the media content item registered by the media content source system 105 (communication 360). For example, the signing service 110 may send a request comprising an identifier of the media content source system 105 (e.g., a company name, a unique identifier assigned to the content owner by the identity authority 115, a unique identifier assigned to the content owner by the signing service 110, or any suitable combination thereof) and an identifier of the media content item (e.g., a title of the media content item, a digital fingerprint of the media content item, a unique identifier assigned to the media content item by the signing service 110, the identity authority 115, or the media content source system 105, or any suitable combination thereof). In response to the request, the identity authority may send a response that indicates the rights granted by the media content source system 105 for modification of the media content item. The response may indicate the rights in plain text (e.g., for display on a web page) or in a machine-readable format (e.g., by populating a data structure that facilitates the communication 360).

The signing service 110 signs the media content item using the private key of the media content source system 105. The signature data may be embedded in the media content item and may indicate the rights associated with the media content item. For example, the rights data may be converted into a fixed-size data object (e.g., a 64-byte data object). A hash is generated based on one or more portions of the media content item. The hash and the fixed-size data object are encrypted using the private key and embedded into an IDR frame. In some example embodiments, the hash is generated based on a group of pictures spanning from the IDR to the frame immediately before the next IDR frame. In other example embodiments, the hash is generated based on the IDR frame alone.

In response to the signature request communication 340, the signing service 110 sends the signed content in communication 370. The media content source system sends the signed content, in communication 380, to the content distribution network 305 (e.g., the streaming platform 120, the social network 125, or an intermediary system that redistributes content to the streaming platform 120 or the social network 125). In some example embodiments, the content access device 140 is also a media content source system 105. Thus, a user of a social network may register as a content owner with the identity authority 115, register and sign content using the signing service 110, and upload content to the content distribution network 305 for distribution to other users of the social network.

In communication 390, the media content source system 105 optionally records a transaction for the signed content with the blockchain node 135. For example, an identifier of a purchaser of the signed content, an identifier of the media content source system 105, a timestamp of the transaction, an identifier of the content distribution network 305 that distributes the signed content to the purchaser, a price of the signed content, or any suitable combination thereof may be included as an entry in the distributed ledger of the blockchain served by the blockchain node 135. In the event of a refund request, the transaction can be verified using the blockchain and a second entry stored in the blockchain that indicates that authorization to the purchaser to consume the signed content has been revoked.

Thus, by use of the communications of FIG. 3, the media content source system 105 is enabled, by the signing service 110, the identity authority 115, the blockchain node 135, and the content distribution network 305 (or any suitable subset thereof) to register, sign, and distribute media content items. The content distribution network 305 receives the media content items and is able to verify the creator of each item and the rights associated with each item. As a result, the content distribution network 305 may be better able to avoid distributing pirated content. For example, an uploaded video of a popular movie can immediately be checked to confirm that it is authentic and that the upload conforms with the rights granted by the producer. If the uploaded copy of the movie is inauthentic (e.g., has been modified to remove the authentication data or is a re-recording) or the upload is counter to the rights granted by the producer, the content distribution network 305 refrains from distributing the uploaded copy of the movie.

Figure 4:
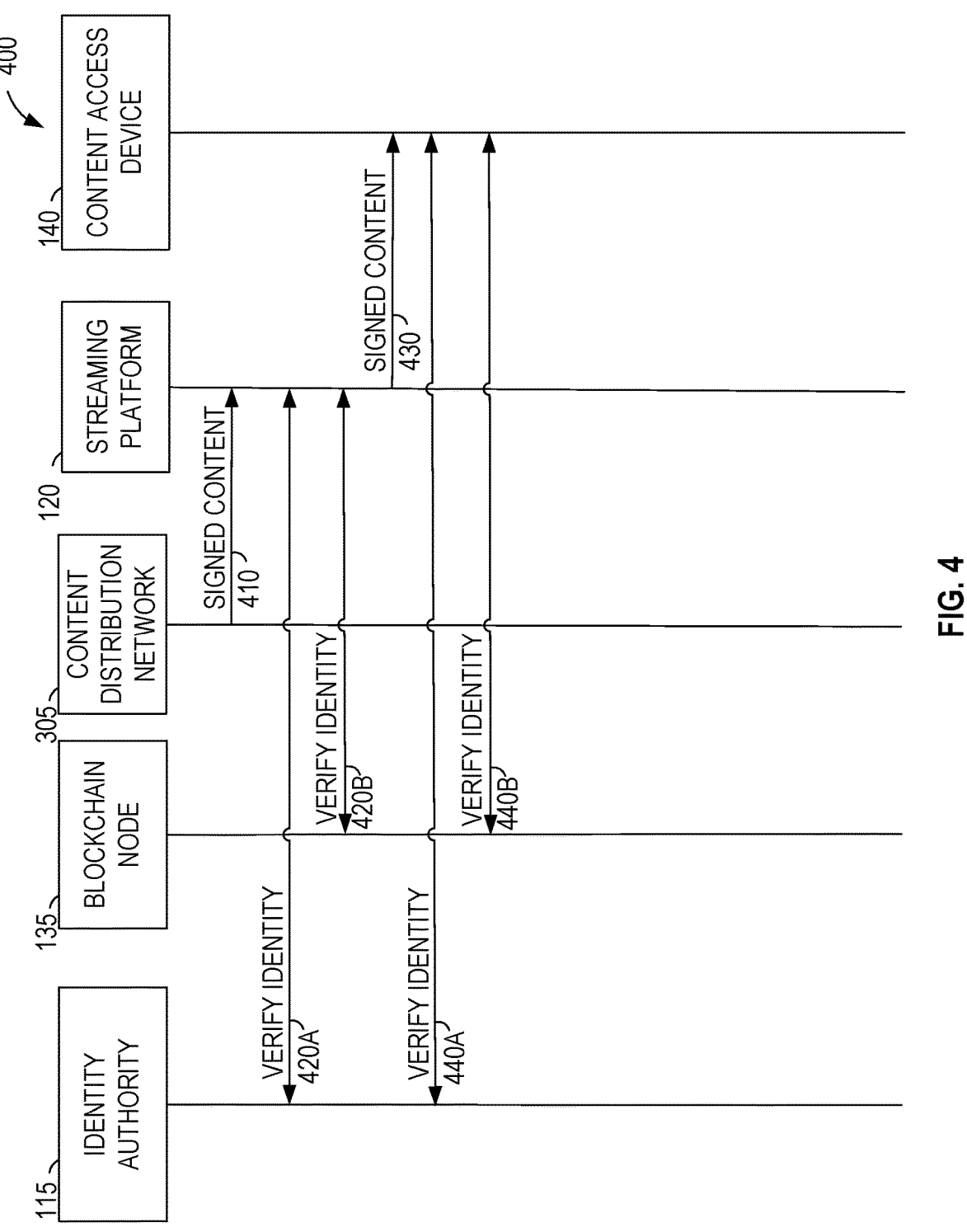
FIG. 4 is a swimlane diagram showing communications among systems, according to some example embodiments, suitable for implementing media authentication.

FIG. 4 is a swimlane diagram 400 showing communications among systems, according to some example embodiments, suitable for implementing media authentication. The swimlane diagram 400 shows communications 410, 420A, 420B, 430, 440A, and 440B among the identity authority 115, the blockchain node 135, the content distribution network 305, the streaming platform 120, and the content access device 140. For simplicity, FIG. 4 does not show the social network server 125, but the functions performed by the streaming platform 120 may be performed by any system that redistributes media content items including, for example, a social network.

The streaming platform 120 receives, in communication 410, the signed content from the content distribution network 305. The signed content includes an identifier of the content owner. The streaming platform 120 verifies the identity of the content owner with the identity authority (in communications 420A) or a blockchain (in communications 420B). For example, the streaming platform 120 may request the public key of the identified content owner from the identity authority 115 or from the blockchain node 135 and receive the requested public key in response. Using the public key, the streaming platform 120 decrypts encrypted data embedded in the media content item and verifies that the signature is valid. For example, the streaming platform 120 may generate a hash of at least a portion of the media content item and compare the generated value with a decrypted hash value. If the hashes match, the content and signature are authentic. If the hashes don't match, the media content item has been tampered with in some way. The streaming platform 120 may decline to redistribute unauthenticated media content items. In some example embodiments, the streaming platform 120 does not verify the identity of the content owner and redistributes content without performing authentication.

The streaming platform 120, in communication 130, sends the signed content to the content access device 140. The content access device 140 is also enabled, through the use of communications 440A or 440B, to verify the identity of the creator of the media content item, by performing the operations described above with respect to the streaming platform 120. The content access device 140 may decline to play media content items that are unauthenticated, may display an alert that allows the user to either continue with playback or abort playback, may display an alert during playback that indicates that the content is unauthenticated, or any suitable combination thereof.

In some example embodiments, the streaming platform 120 may be a trusted streaming platform of the content access device 140. In these example embodiments, the content access device 140 may refrain from authenticating the media content item, instead trusting that any media content item received from the streaming platform 120 has already been authenticated.

The identity authority 115 may track the verification requests received in communications 420A and 440A, thus building a database regarding accesses of the media content item. This information may be shared with the media content source system 105, e.g., for calculation of royalties, prioritization of advertising, directing future investment, or any suitable combination thereof. As another example, a media content item may be an advertisement and the verification requests allow the advertiser to determine how many unique devices have received the media content item and, in embodiments in which requests are sent to the identity authority 115 for each segment of the media content item, how much of the media content item was viewed. For example, if each segment has a duration of one second, and five segments of a thirty-second commercial were verified, the identity authority 115 is able to determine that only five seconds of the commercial were viewed.

Information regarding the portions of the media content items viewed by recipients may be provided by the identity authority 115 to the media content source system 105. Based on the portion information (e.g., position within the media content item, duration viewed, number of viewers, or any suitable combination thereof), the media content source system 105 may make future decisions. For example, a public service announcement or emergency alert issued by a government may be re-sent to individuals that did not view the media content item or did not view more than a predetermined threshold (e.g., 50%) of the media content item. As another example, advertising purchases may be directed to content distribution networks that have a higher rate of engagement by end users (e.g., a greater percentage of users that watch the media content item to completion, a higher average viewing time of the media content item, or any suitable combination thereof).

Thus, by use of the communications of FIG. 4, the content access device 140 is enabled, by the identity authority 115, the blockchain node 135, the content distribution network 305, and the streaming platform 120 (or any suitable subset thereof) to verify the identity of the creator of media content items and to detect modifications to media content items. The content access device 140 receives the media content items and is able to verify the creator of each item and the rights associated with each item. As a result, the user of the content access device 140 may be better able to avoid watching pirated content, to detect modification of content, or both. For example, a digital clip of a politician speaking may be authenticated as having been produced by a reputable news organization, but the verification of the hash of a portion of the clip may fail, indicating that that portion of the clip was modified after being distributed by the news organization.

The communications of FIGS. 3-4 may be used in a "just in time" scenario in which the content access device 140 requests a media content item from the streaming platform 120 and, in response, the streaming platform 120 requests a bespoke version of the media content item from the media content source system 105 (either directly or via the content distribution network 305). The media content source system 105 registers a unique version of the media content item and embeds a unique signature. For example, a unique public/private key pair may be used for the unique version. As another example, an identifier of the content access device 140 (e.g., a customer identifier, an Internet protocol (IP) address, a media access control (MAC) address, an international mobile subscriber identity (IMSI), or any suitable combination thereof) may be used as part of the signed data. The unique signed version is provided to the content access device 140 (e.g., via the content distribution network 305 and the streaming platform 120). Each device that plays the unique media content item requests the public key of the media content source system 105 from the identity authority 115, which is enabled to determine how many different devices are accessing that particular copy of the media content item. This may be useful to determine the original legal copy of a subsequently pirated work. Alternatively, by tracking the number of "just in time" versions of a media content item that are created, the media content source system 105 is enabled to judge the popularity of the media content item or, in the case of advertisements, the effectiveness of an advertising campaign.

As yet another alternative, the streaming platform 120 may have access to multiple signed versions of the media content item and select which one to send to the content access device 140. For example, 100,000 unique versions of the media content item could be signed ahead of time and a record created in a database to map the unique identifier of user to the unique identifier of the version of the media content sent to the user.

Figure 5:
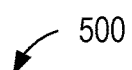
FIG. 5 is a block diagram illustrating embedding of authentication data in a media content item, according to some example embodiments.

FIG. 5 is a block diagram 500 illustrating embedding of authentication data in a media content item, according to some example embodiments. The block diagram 500 shows two groups of pictures (GOPs) 510A and 510B. The GOP 510A includes IDR frame 520A, P frames 530A, 540A, and 560A, B frame 550A, and Video Coding Layer (VCL) 570A. The GOP 510B includes IDR frame 520B, P frames 530B and 540B, and VCL 570B. The VCLs 570A and 570B contain embedded data 580A and 580B, respectively.

In some example embodiments, the GOPs 510A and 510B are part of an MPEG-4 file. The IDR frames 520A and 520B fully define a frame of the video content. The P frames 530A, 540A, 560A, 530B, and 540B and the B frame 550A include data for a frame of the video content, but rendering the frame relies on data from other frames of the video content. For example, a P frame indicates changes relative to one or more preceding frames. A B frame indicates changes relative to one or more preceding or succeeding frames. After an IDR frame is received, no later frames are allowed to reference any frames before the IDR frame. Thus, each GOP can be played back independently of each other GOP, but only the IDR frame of each GOP can be displayed without reference to one or more other frames of the GOP. In some example embodiments, the size of a GOP is 15 frames or 30 frames.

The embedded data 580A and 580B may be embedded in the VCLs 570A and 570B using SEI messages defined by the ISO/IEC standard 14496-10, Advanced Video Coding. For example, data may be embedded as registered user data or unregistered user data, as described by Annex D of ISO/EEC 14496-10. Other methods of embedding data may also be used. For example, an invisible watermark may be used to embed data directly in the IDR frame by manipulating the low-order bits of a number of pixels to transfer information in the image with little effect on the image itself.

By embedding the digital signature of each GOP in the IDR frame of the GOP, manipulation of a media content item may be detected at the GOP level. The digital signature may be of the IDR frame alone, all frames of the GOP, an audio track of the GOP, a subtitle track of the GOP, or any suitable combination thereof.

In example embodiments using public/private key encryption, the digital signature may comprise data encrypted using the content owner's private key. Thus, a recipient of the media content item can recover the data by using the content owner's public key. The encrypted data may include one or more hashes generated for the media content item, allowing verification that the media content item has not been modified by regenerating a hash from the media content item and comparing the hash with the corresponding value that was signed by the content owner.

Additionally or alternatively, the encrypted data may include an indication of rules to be followed in modifying the media content item. As used herein, the terms "rights," "permissions," and "rules" all refer to grants or restrictions defined by a content owner that affect how a media content item may be modified. The rules may differ from segment to segment of the media content item. For example, a segment that may be taken out of context may include a rule that requires that the segment only be presented with a number of preceding and succeeding segments to provide the context; other segments may not include that rule, allowing them to be presented individually.

By including the rules in the encrypted data, the recipient of the media content item is assured that the embedded rules have not been modified. Alternatively, the rules may be included without encryption, allowing for faster access. To verify that the rules are authentic, the recipient of the media content item requests the rules from a central authority (e.g., the identity authority 115). The request may include an identifier of the media content item, an identifier of the media content owner, an identifier of a segment of the media content item, or any suitable combination thereof.

The rules may be defined using a standardized format. For example, a 24-bit data structure may be used, defined as follows:

8 bits: preceding segments
    8 bits: succeeding segments
    2 bits: audio
    2 bits: resolution
    2 bits: text
    2 bits: speed The preceding segments value indicates a number of preceding segments (e.g., in the range 0-255) that must be included when presenting this segment. The succeeding segments value indicates a number of succeeding segments that must be included when presenting this segment. The audio value indicates whether no modifications to audio are permitted, language translations are permitted, additional commentary is permitted but deletions of original audio are not permitted, or all audio modifications are permitted. The resolution value indicates whether no modifications to video resolution are permitted, whether modifying the resolution to one of two predefined resolutions (e.g., HD or SD) is permitted, or all resolution modifications are permitted. The text value indicates whether no modifications to text (e.g., subtitles) are permitted, language translations are permitted, additional text is permitted but deletion of original text are not permitted, or all text modifications are permitted. The speed value indicates whether no modifications to speed (e.g., frame rate) are permitted, whether a modification to speed is permitted only if an entire presented clip is modified in the same way, whether a modification to speed is permitted to reduce speed but not increase speed, or whether all speed modifications are permitted. In various example embodiments, other standardized rule structures may be used, with more or fewer fields, larger or smaller field sizes, and the like.

The signed or encrypted data may also include an identifier of the original purchaser of this copy of the media content, an identifier of the transaction including this copy of the media content, or both. A device playing the media content may be associated with an identifier of the owner of the media device and refuse to play media content not purchased by the owner. For example, media content lacking an identifier of a purchaser may not be played, media content identifying a different purchaser may not be played, media content for which signature verification fails may not be played, or any suitable combination thereof. Additionally or alternatively, the device may display a warning for any of these conditions.

The embedded data 580A or 580B enables individual copies of media content items to function as non-fungible tokens (NFTs). The signed or encrypted data includes a unique identifier of the individual copy of the media content item. The owner of the individual copy is registered with the identity authority 115 or the blockchain node 135. Transactions for the individual copy are recorded with the identity authority 115 or the blockchain node 135. Thus, every recipient of the signed copy of the media content item is able to determine that this particular copy is owned by the identified owner or a successor in interest identified by the transaction log in the blockchain or database maintained by the identity authority 115.

FIG. 6 is a flowchart illustrating operations of a method 600 suitable for implementing media authentication, according to some example embodiments. The method 600 includes operations 610, 620, 630, 640, 650, and 660. By way of example and not limitation, the method 600 is described below as being performed by the media content source system 105 and the media content modification system 130, in communication with the signing service 110 and the identity authority 115 using the network 150, all of FIG. 1.

In operation 610, a content owner (e.g., the media content source system 105) accesses an unsigned GOP (e.g., the GOP 510A of FIG. 5, without the embedded data 580A). For example, the content owner may be an individual, a news organization, a government agency, or a movie studio creating an MPEG-4 including video, audio, and subtitle data.

The content owner, in operation 620, signs the IDR using a private key of the content owner. For example, the content owner may sign each IDR of the created media content item by generating a hash of each GOP and encrypting the hash using a private key of a public/private key pair. The content owner provides the signed media content item to a first content transcoder (e.g., the media content modification system 130, taking the role of the content access device 140 in FIG. 4 and receiving the media content item from the streaming platform 120).

The first transcoder transcodes the IDR (operation 630). For example, the media content item may have been distributed by the content owner in a high definition (HD) format. The first transcoder may transcode the media content item, including the IDR, to a standard definition (SD) format for distribution over reduced-bandwidth channels.

In some example embodiments, the first transcoder (e.g., the media content modification system 130) accesses a segment of a media content item, the segment comprising embedded data that indicates a rule regarding modification of the segment. In this example, the rule permits transcoding to HD format. In other examples, the rule prohibits transcoding and when the media content modification receives a request to modify the segment in violation of the rule, based on the request violating the rule, the media content modification system 130 does not modify the segment in accordance with the request.

In operation 640, the first transcoder signs the transcoded IDR combined with the owner's signature, using the first transcoder's private key. The first transcoder's signature and the owner's signature are both embedded in the transcoded IDR. Thus, a recipient of the modified media content item is enabled to use the first transcoder's public key to decrypt the signature and verify the identity of the first transcoder. The recipient may not have access to the unmodified IDR, and so, while the recipient can confirm the identity of the original owner by decrypting the owner's signature using the owner's public key, the recipient relies on the first transcoder's signature as confirmation that no unauthorized modifications to the content item were made.

A second transcoder, in operation 650, transcodes the IDR. For example, the SD format version of the media content item created in operation 630 may be modified to add a second-language audio track.

In operation 660, the second transcoder signs the transcoded IDR combined with the first transcoder's signature, using the second transcoder's private key. The second transcoder's signature, the first transcoder's signature, and the creator's signature are all embedded in the transcoded IDR.

Thus, a recipient of the twice-modified media content item is enabled to use the second transcoder's public key to decrypt the signature and verify the identity of the second transcoder.

Operations 650 and 660 may be repeated any number of times for any number of additional transcoders. Thus, a recipient of a modified media content item is able to confirm the chain of entities that created and modified the media content item. This allows the recipient to confirm that no malicious entities have manipulated the media content item.

FIG. 7 is a flowchart illustrating operations of a method 700 suitable for implementing media authentication, according to some example embodiments. The method 700 includes operations 710, 720, 730, and 740. By way of example and not limitation, the method 700 is described below as being performed by the content access device 140 in communication with the signing service 110 and the identity authority 115 using the network 150, all of FIG. 1.

In operation 710, the content access device 140 accesses a plurality of segments of a media content item, each segment of the plurality of segments comprising embedded data, the media content item indicating a content owner. For example, the content access device 140 may stream a media content item from the streaming platform 120, wherein each GOP in the stream is a segment that includes embedded data (e.g., the embedded data 580A of FIG. 5). The embedded data may include an indicator of the content owner. For example, in addition to the signature added in operation 620 of FIG. 6, the content owner may also add an identifier of itself.

Based on the embedded data for each segment of the plurality of segments, the content access device 140 determines whether the segment was signed by the content owner (operation 720). For example, the content device 140 may send a request that includes the identifier to the identity authority 115. In response, the content device 140 receives a public key of the identified content owner. The content device 140 uses the public key to verify the signature embedded in the segment or to determine that the signature is invalid.

In operation 730, the content access device causes presentation on a display device of at least one segment of the plurality of segments. For example, each segment may be displayed as it is received regardless of whether authentication is successful or only successfully authenticated segments may be displayed.

The content access device 140, in operation 740, causes presentation on the display device of an indication of whether the segment was signed by the content owner. For example, one of the user interfaces of FIGS. 9-12 may be presented.

Thus, by use of the method 700, a content access device (e.g., a user's personal computer, smart phone, tablet, set-top box, or other computing device) is enabled to detect and display information regarding the creator of media content items. In this way, a user is better able to trust the authenticity of the media content items being viewed.

Figure 8:
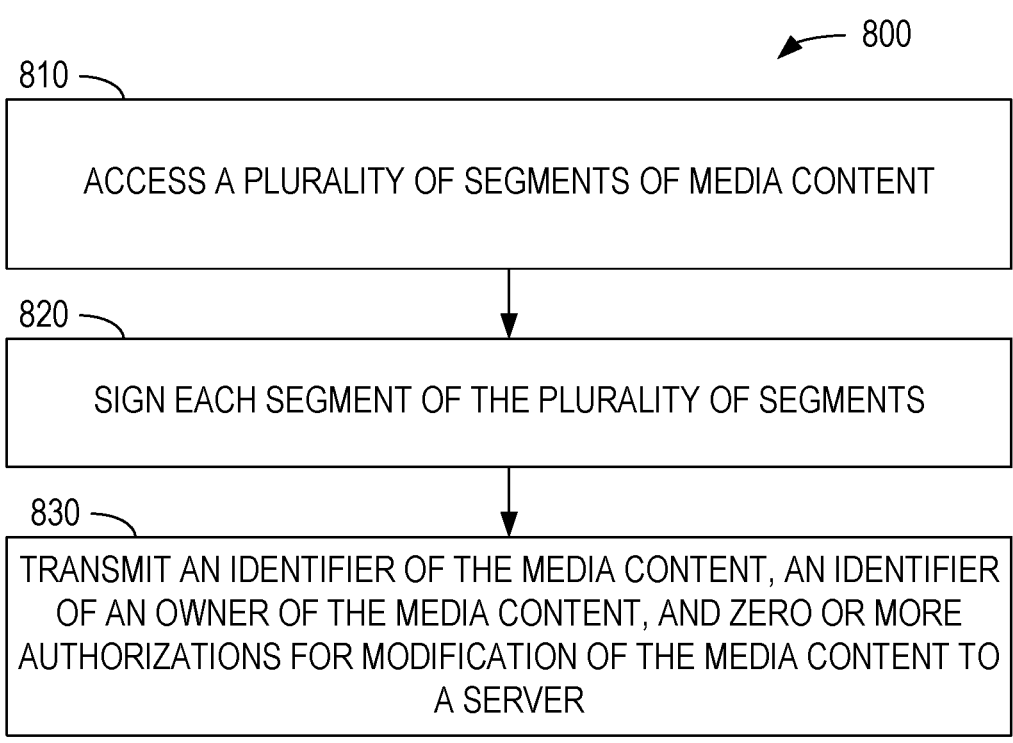
FIG. 8 is a flowchart illustrating operations of a method suitable for implementing media authentication, according to some example embodiments.

FIG. 8 is a flowchart illustrating operations of a method 800 suitable for implementing media authentication, according to some example embodiments. The method 800 includes operations 810, 820, and 830. By way of example and not limitation, the method 800 is described below as being performed by the media content source system 105 and the signing service 110 in communication with the identity authority 115 using the network 150, all of FIG. 1.

In operation 810, the media content source system 105 or the signing service 110 accesses a plurality of segments of a media content item. For example, the media content source system 105 may access segments of a media content item (e.g., of a live streaming event) as they are created or from storage. As another example, the signing service 105 may access segments of a media content item received from the media content source system 105 for signing.

The media content source system 105 or the signing service 110, in operation 820, signs each segment of the plurality of segments. For example, a hash of each segment may be generated and the hash signed using a private key of the media content source system 105. The signed hash may be embedded in the data segment (e.g., in the form of the embedded data 580A embedded in the VCL 570A in FIG. 5).

In operation 830, the media content source system 105 transmits an identifier of the media content item, an identifier of an owner of the media content item, and zero or more authorizations for modification of the media content item to a server (e.g., the identity authority 115). The identity authority 115 registers the transmitted information, allowing the content distribution network 305, or any of the systems of FIG. 1 to request the identifier of the owner and the authorizations for modification, so long as the identifier of the media content item is known. The identifier of the media content may be part of the data embedded in the media content item to facilitate queries to the identity authority 115.

Thus, by use of the method 800, the media content source system 105 is enabled to embed authentication data into a media content item and to register authorizations for modification with a central server. This allows a third party that desires to perform only authorized modifications to easily determine which modifications are authorized. The registration also enables a third party that desires to avoid playing back unauthorized modifications to determine if detected modifications comply with the authorizations provided by the media content owner.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Figure 9:
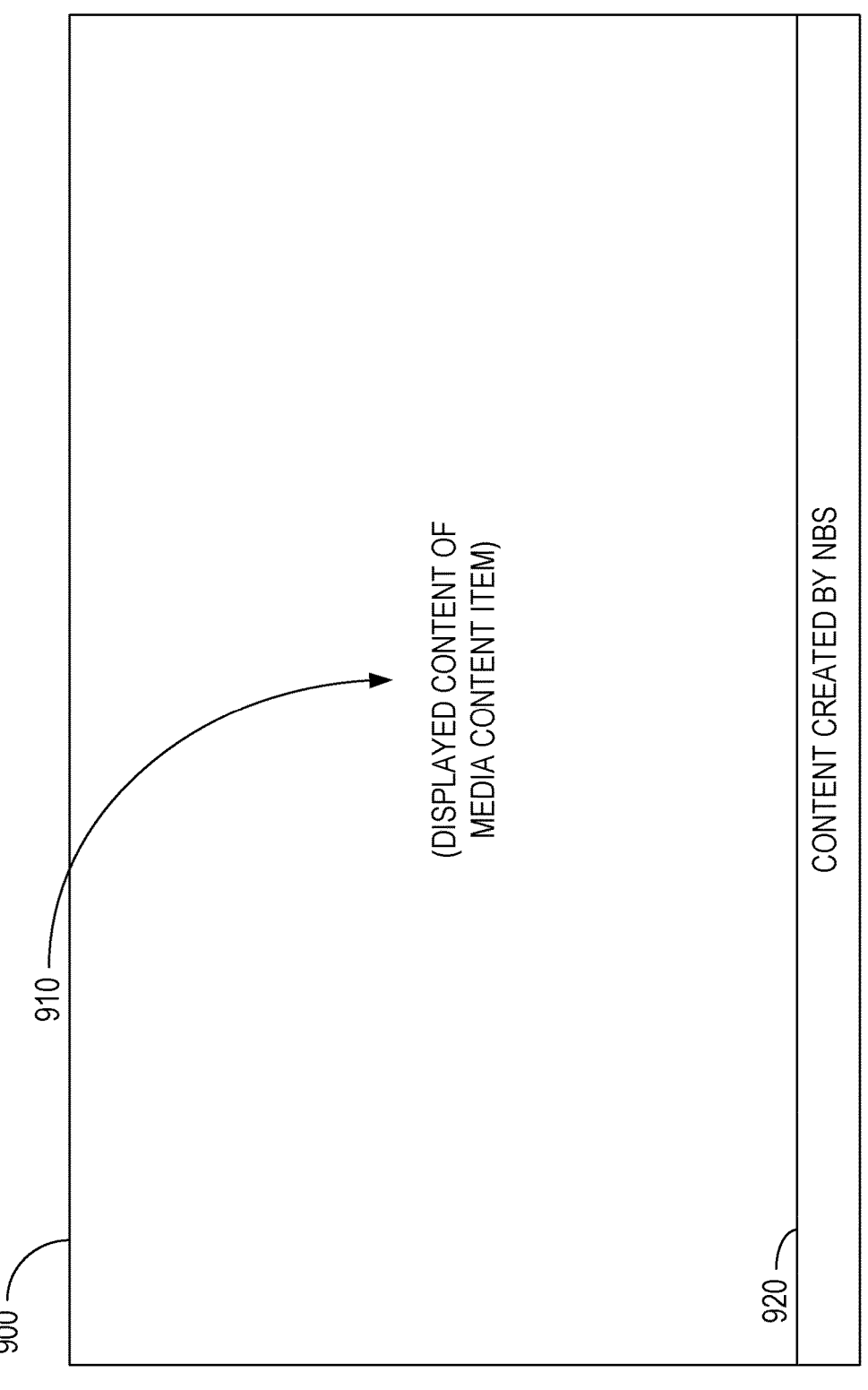
FIG. 9 is a user interface diagram illustrating a user interface suitable for displaying an authenticated media content item, according to some example embodiments.

FIG. 9 is a user interface diagram illustrating a user interface 900 suitable for displaying an authenticated media content item, according to some example embodiments. As can be seen in the user interface diagram, the user interface 900 includes an area 910 that displays content of a media content item and an informational area 920 that displays an informational message regarding the displayed content. In the example of FIG. 9, the informational area 920 indicates that the content was created by NBS, a fictional news organization. The user interface 900 may be displayed in response to successful authentication of signature data embedded in the media content item (e.g., via the communications of the swimlane diagram 400 of FIG. 4).

Figure 10:
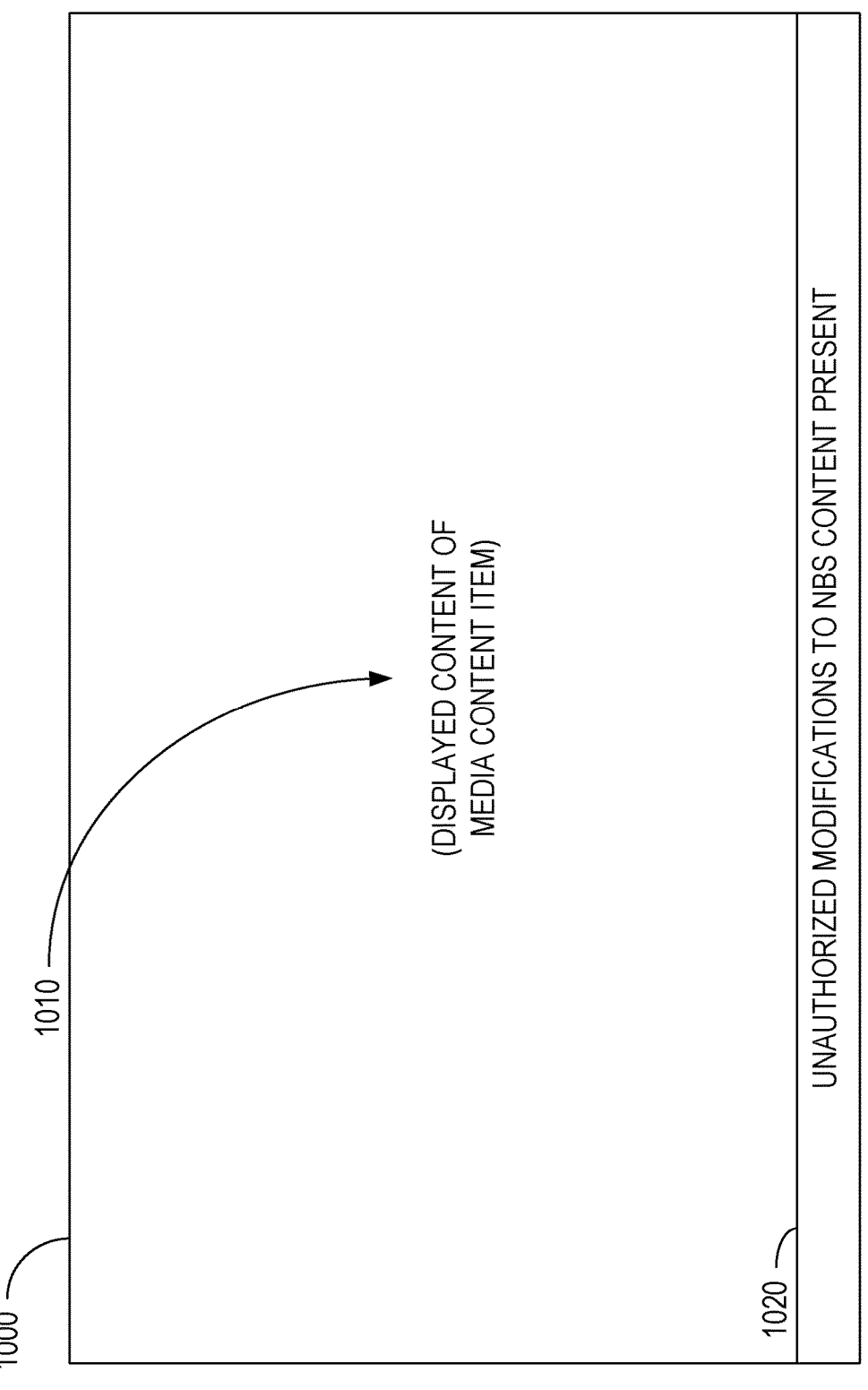
FIG. 10 is a user interface diagram illustrating a user interface suitable for notifying a user that unauthorized modifications were made to a media content item, according to some example embodiments.

FIG. 10 is a user interface diagram illustrating a user interface 1000 suitable for notifying a user that unauthorized modifications were made to a media content item, according to some example embodiments. As can be seen in the user interface diagram, the user interface 1000 includes an area 1010 that displays content of a media content item and an informational area 1020 that displays an informational message regarding the displayed content. In the example of FIG. 10, the informational area 1020 indicates that the content was created by NBS, but that unauthorized modifications to the media content item are present. The user interface 1000 may be displayed in response to confirming with the identity authority 115 that the media content item was registered by NBS, but determining that the signature of the media content item is invalid. For example, the signature may be successfully decrypted using a public key of NBS obtained from the identity authority 115, but a comparison of a hash generated from the media content item with a hash stored in the signature may not match, indicating that the data of the media content item was modified after it was signed by NBS.

Figure 11:
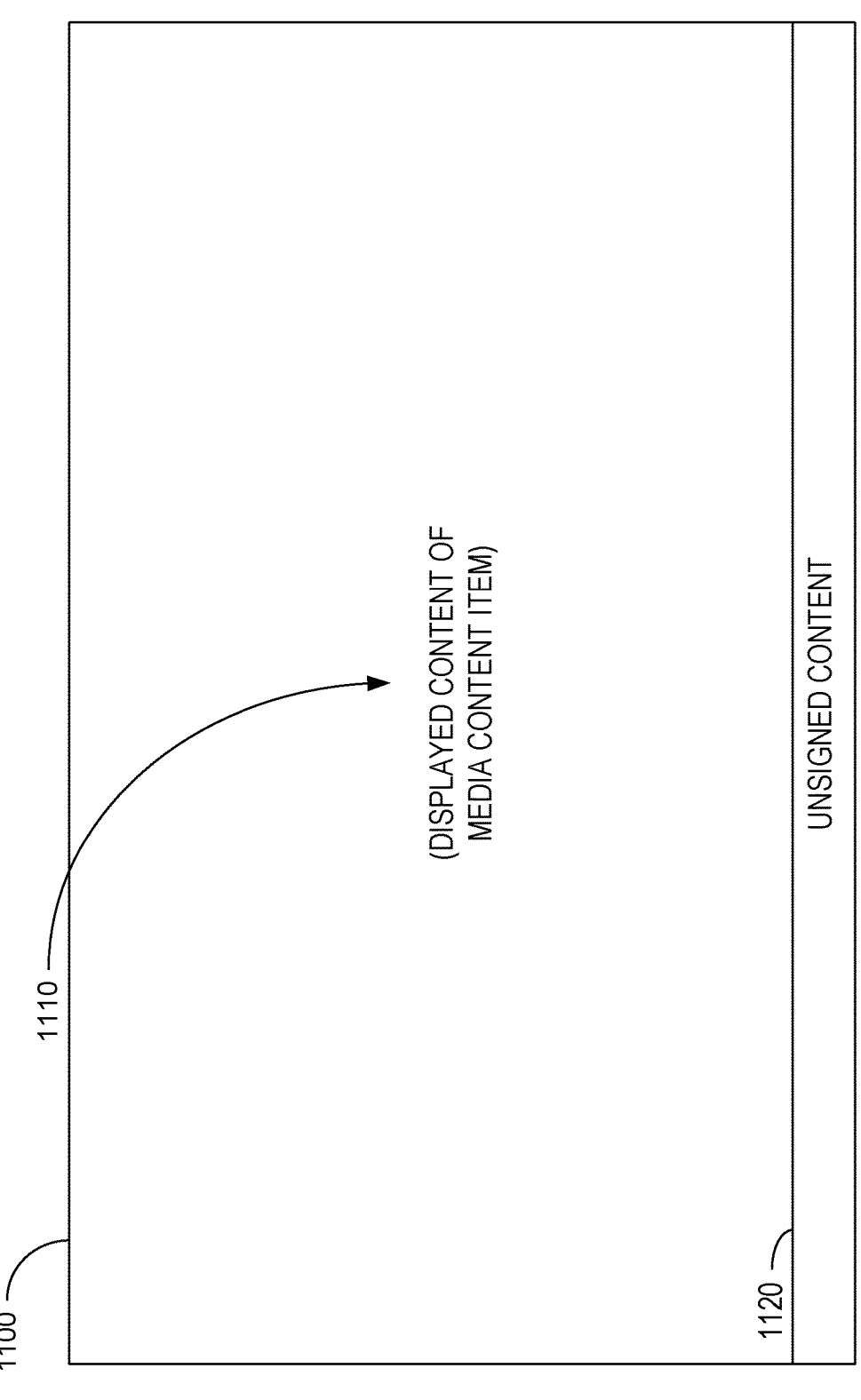
FIG. 11 is a user interface diagram illustrating a user interface suitable for displaying an unauthenticated media content item, according to some example embodiments.

FIG. 11 is a user interface diagram illustrating a user interface 1100 suitable for displaying an unauthenticated media content item, according to some example embodiments. As can be seen in the user interface diagram, the user interface 1100 includes an area 1110 that displays content of a media content item and an informational area 1120 that displays an informational message regarding the displayed content. In the example of FIG. 11, the informational area 1120 indicates that the media content item being displayed is unsigned. This may indicate that the media content item was originally created without being signed, or may indicate that the media content item was manipulated to remove embedded signature data. If the media content item includes an identification of the creator (e.g., a movie studio's logo at the beginning of a feature film or a news stations logo in a corner of the screen during a news report) and the creator is known to sign media content items it creates, the informational area 1120 effectively informs the user that the content has been modified by removing the signature.

Figure 12:
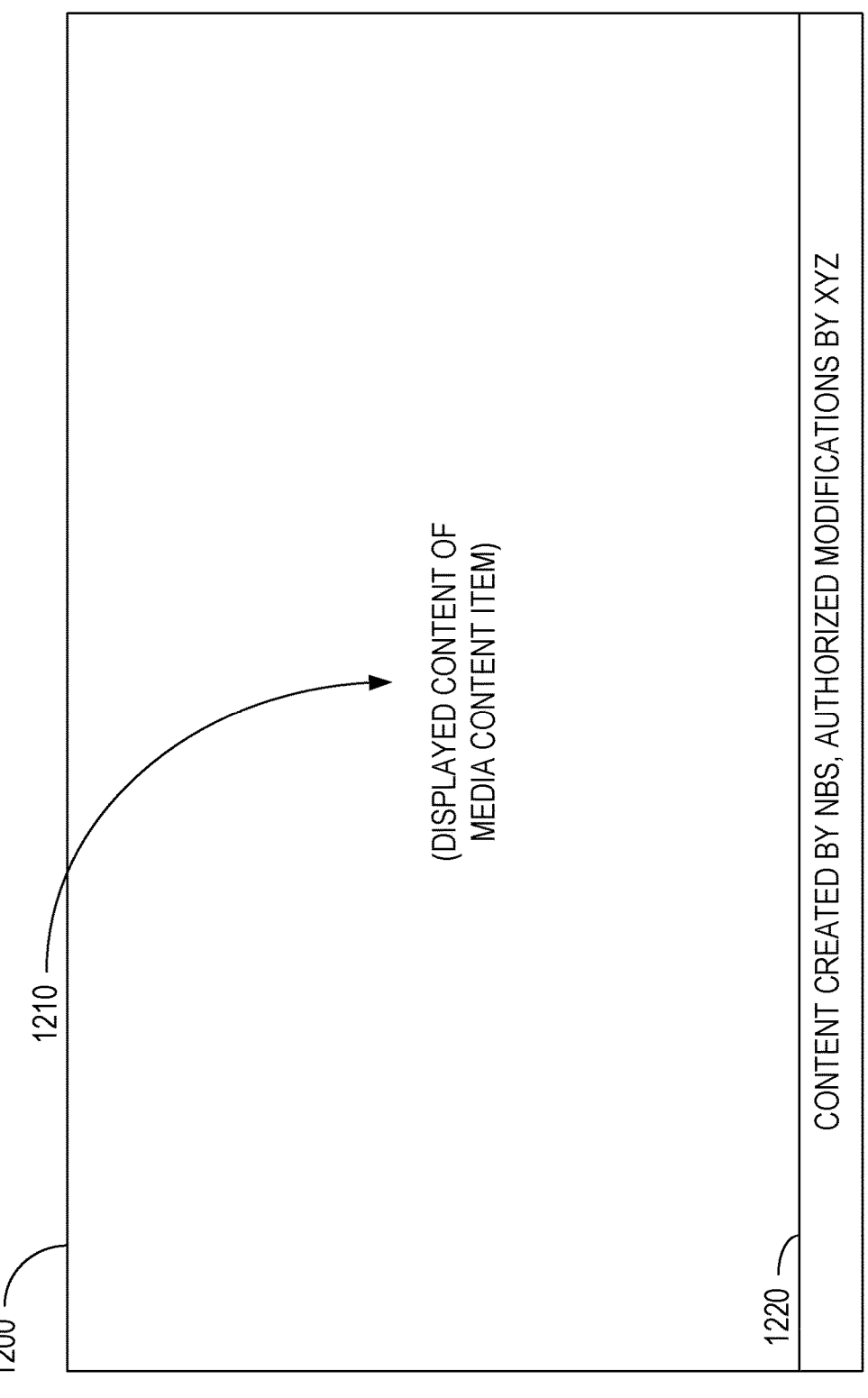
FIG. 12 is a user interface diagram illustrating a user interface suitable for notifying a user that authorized modifications were made to a media content item, according to some example embodiments.

FIG. 12 is a user interface diagram illustrating a user interface 1200 suitable for notifying a user that authorized modifications were made to a media content item, according to some example embodiments. As can be seen in the user interface diagram, the user interface 1200 includes an area 1210 that displays content of a media content item and an informational area 1220 that displays an informational message regarding the displayed content. In the example of FIG. 12, the informational area 1220 indicates that the content was created by NBS and authorized modifications were made by XYZ, a fictional third party. In this example, the content access device 140, the streaming platform 120, or the social network 125 verified the signature of XYZ using the public key of XYZ registered with the identity authority 115. Additionally, the content access device 140, the streaming platform 120, or the social network 125 confirmed that NBS was the registered creator of the content by verifying a signature of NBS embedded in the media content item.

An example of an authorized modification is altering the resolution of video content to reduce bandwidth consumption when streaming to lower-resolution devices. For example, a high definition (HD) video may be reduced to standard definition (SD) without otherwise changing the media content item. The video content may include a digital watermark can be verified even after the resolution is changed.

An example of an unauthorized modification is taking a clip of a media content item that is below a minimum clip length specified by the content owner. For example, to reduce the risk that clips will be taken out of context, the content owner may authorize clips to be taken that are no less than 30 seconds in duration. The content access device 140 verifies the signature of each segment of the media content item and determines, via communication with the identity authority 115, that clips are authorized if they are at least 30 seconds in duration. The content access device 140 determines the total duration of the segments and compares the determined duration to the minimum authorized duration. If the total duration of the segments is too short, the user interface 1200 may be displayed to inform the user. Alternatively, an informational message specifically identifying the unauthorized modification may be presented. For example, "This clip is 10 seconds long, less than the 30 second minimum authorized clip length."

In some example embodiments, the informational areas 920, 1020, 1120, and 1220 are operable to cause display of additional information about the media content item. For example, a user may click or touch an informational area to cause a pop-up window to be presented that informs the user of the identity of the content owner embedded in the media content item, the identity of the content owner reported by the identity authority 115 as having registered the media content item, zero or more identities of transcoders that modified and signed the media content item, authorization permissions registered for the media content item, a date of creation or modification of the media content item, or any suitable combination thereof.

In the examples of FIG. 9-12, the source of the media content item is a news broadcaster. As another example, the source of the media content item may be a government agency. Based on the signature data in the media content item, the content access device 140 is able to validate the source of the media content item. In response to a determination that a government agency is the source of the media content item, higher priority may be given by the content access device 140 to the media content item. For example, an emergency alert message may be received and, once validated as being a legitimate emergency message from a particular government agency, the emergency alert message interrupts another media content item being played by the content access device 140.

Figure 13:
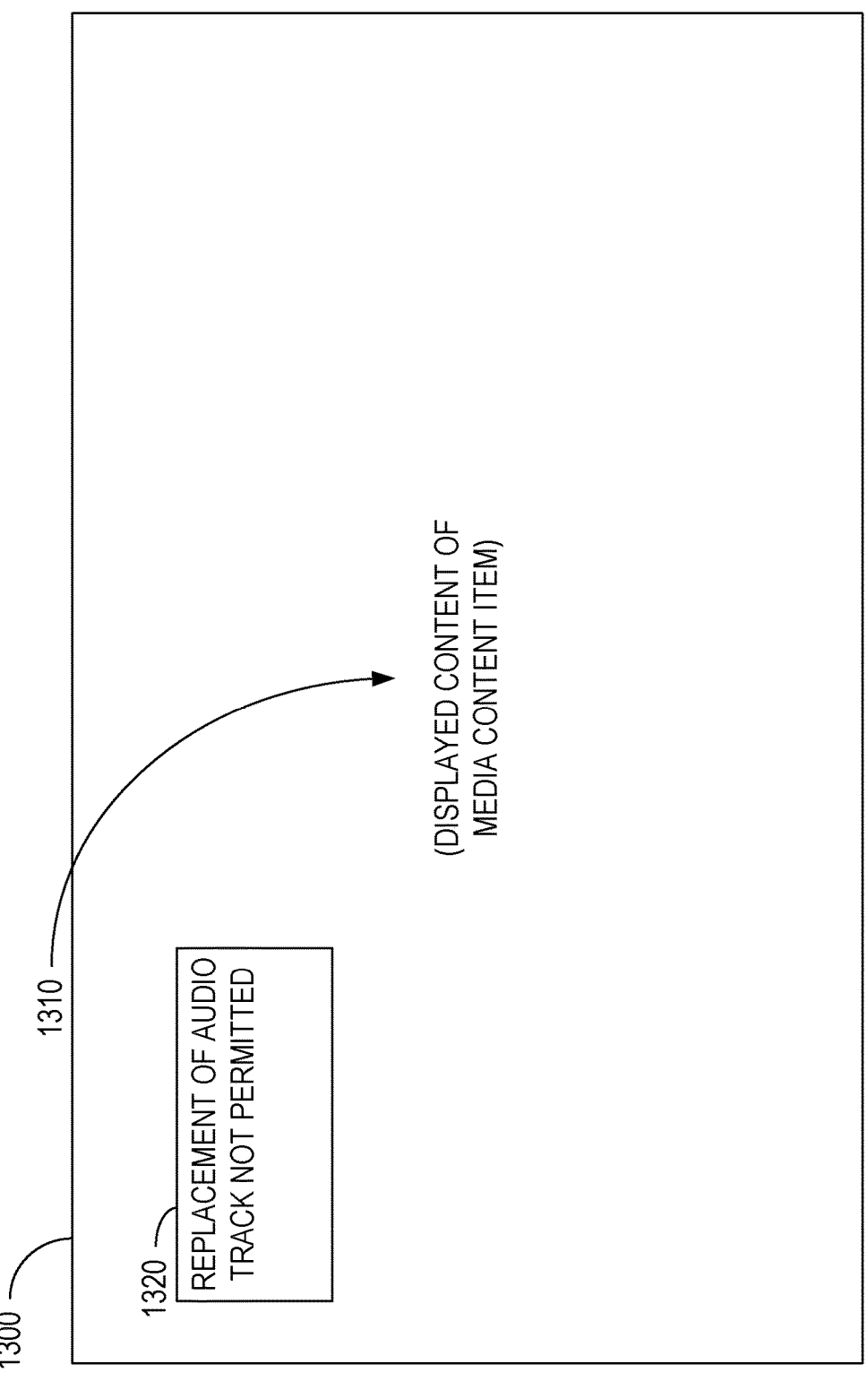
FIG. 13 is a user interface diagram illustrating a user interface suitable for notifying an editor that an attempted modification of a media content item is not permitted, according to some example embodiments.

FIG. 13 is a user interface diagram illustrating a user interface suitable for notifying an editor that an attempted modification of a media content item is not permitted, according to some example embodiments. As can be seen in the user interface diagram, the user interface 1300 includes an area 1310 that displays content of a media content item and an informational area 1320 that displays an informational message regarding an attempted modification of the displayed content. In the example of FIG. 13, the informational area 1320 indicates that an attempted replacement of the audio track of a segment of the media content item is not permitted.

In this example, the media content modification system 130 verified the signature of the content owner using the public key of the content owner registered with the identity authority 115. The media content modification system 130 determined which modifications to the media content item were permitted or forbidden either by receiving rules from the identity authority 115 in response to a request or by accessing rules that were embedded in the media content item (e.g., in the VCL of segments of the media content item).

Once the media content modification system 130 has the rules that apply to the media content item being modified, the media content modification software is enabled to refuse to perform unpermitted modifications. Accordingly, users will not accidentally make unpermitted modifications and the relationship between an authorized modification system and the media content owner is protected.

Figure 14:
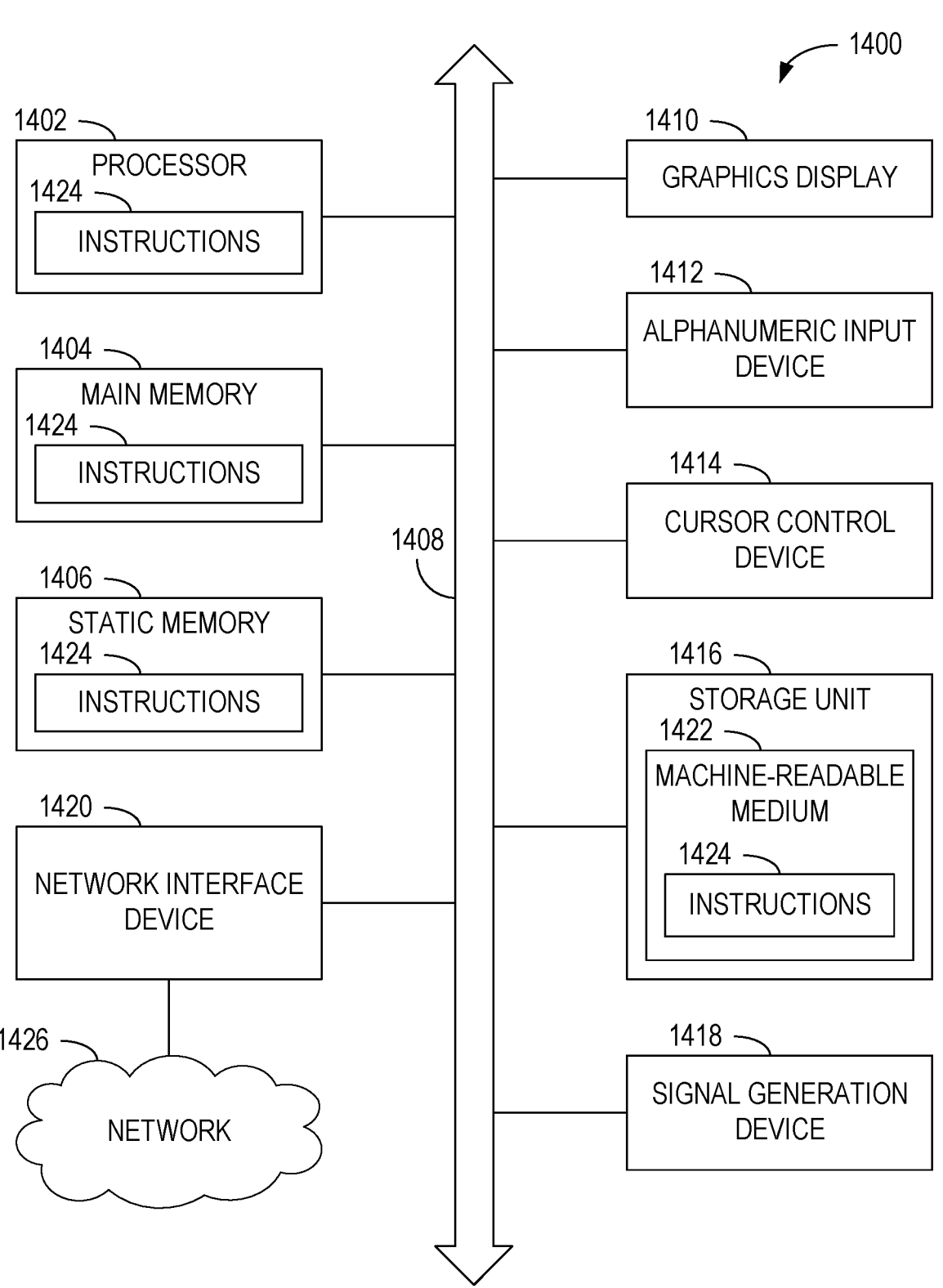
FIG. 14 illustrates a diagrammatic representation of a machine in an example form of a computing device within which a set of instructions, for causing the machine to perform any one or more of the methods discussed herein, may be executed.

FIG. 14 illustrates a diagrammatic representation of a machine in the example form of a computing device 1400 within which a set of instructions, for causing the machine to perform any one or more of the methods discussed herein, may be executed. The computing device 1400 may include a mobile phone, a smart phone, a netbook computer, a rackmount server, a router computer, a server computer, a personal computer, a mainframe computer, a laptop computer, a tablet computer, a desktop computer, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, a network switch, a network bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1400 includes a processing device (e.g., a processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1416, which communicate with each other via a bus 1408.

The processing device 1402 represents one or more general-purpose processing devices such as a microprocessor, central processing unit, or the like. More particularly, the processing device 1402 may include a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1402 may also include one or more special-purpose processing devices such as an application specific integrated circuit (ASIC), a field programmable gate array (FPGA), a digital signal processor (DSP), a network processor, or the like. The processing device 1402 is configured to execute instructions 1426 for performing the operations and steps discussed herein.

The computing device 1400 may further include a network interface device 1422 which may communicate with a network 1418. The computing device 1400 also may include a display device 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1420 (e.g., a speaker). In one implementation, the display device 1410, the alphanumeric input device 1412, and the cursor control device 1414 may be combined into a single component or device (e.g., an LCD touch screen).

The data storage device 1416 may include a computer-readable storage medium 1424 on which is stored one or more sets of instructions 1426 embodying any one or more of the methods or functions described herein. The instructions 1426 may also reside, completely or at least partially, within the main memory 1404 and/or within the processing device 1402 during execution thereof by the computing device 1400, the main memory 1404 and the processing device 1402 also constituting computer-readable media. The instructions 1426 may further be transmitted or received over the network 1418 via the network interface device 1422.

While the computer-readable storage medium 1424 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding, or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such an introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such a recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, some of the terms, or all of the terms. For example, the phrase "A or B" may be understood to include the possibilities of "A" or "B" or "A and B."

Embodiments described herein may be implemented using computer-readable media for carrying or having stored thereon computer-executable instructions or data structures. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid-state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated.

All examples and conditional language recited herein are intended as pedagogical objects to aid the reader in understanding the inventive subject matter and the concepts contributed by the inventor to furthering the art, and are to be construed as being without limitation to such specifically recited examples and conditions. Although embodiments of the present disclosure have been described in detail, it may be understood that various changes, substitutions, and alterations may be made thereto without departing from the scope of the present disclosure.

Example 1 is a system comprising: one or more processors; a memory that stores instructions that, when executed by the one or more processors, cause the one or more processors to perform operations comprising: accessing a plurality of segments of a media content item, each segment of the plurality of segments comprising embedded data, the media content item indicating a content owner; based on the embedded data for each segment of the plurality of segments, determining whether the segment was signed by the indicated content owner; and causing presentation on a display device of at least one segment of the plurality of segments.

In Example 2, the subject matter of Example 1 includes, wherein: the operations further comprise: submitting a request to a server, the request comprising an identification of the content owner; and receiving, from the server, a response to the request, the response comprising a decryption key for the content owner; and the determining whether the segment was signed by the content owner comprises decrypting at least a portion of the embedded data of the segment using the decryption key.

In Example 3, the subject matter of Example 2 includes, wherein the determining whether the segment was signed by the content owner further comprises: calculating a hash value of the segment; and comparing the calculated hash value to a hash value stored in the decrypted embedded data.

In Example 4, the subject matter of Example 3 includes, wherein the hash value of the segment is a hash value of a text portion of the segment.

In Example 5, the subject matter of Examples 2-4 includes, wherein: the decrypted embedded data comprises a hash value for a video portion of the media content item; and the determining whether the segment was signed by the content owner comprises determining whether the video portion of the media content item was signed by the content owner.

In Example 6, the subject matter of Example 5 includes, wherein the operations further comprise: the video portion of the media content item comprises an instantaneous decode refresh (IDR) frame.

In Example 7, the subject matter of Examples 5-6 includes, wherein: the determining whether the video portion of the media content item was signed by the content owner comprises determining that the video portion of the media content item was not signed by the content owner; and the operations further comprise: displaying an indication that the video portion of the segment was not signed by the content owner.

In Example 8, the subject matter of Examples 2-7 includes, wherein: the decrypted embedded data comprises a hash value for an audio portion of the media content item; and the determining whether the segment was signed by the content owner comprises determining whether the audio portion of the media content item was signed by the content owner.

In Example 9, the subject matter of Example 8 includes, wherein: the determining whether the audio portion of the media content item was signed by the content owner comprises determining that the audio portion of the media content item was not signed by the content owner; and displaying an indication that the audio portion of the segment was not signed by the content owner.

In Example 10, the subject matter of Examples 1-9 includes, wherein: the system further comprises a network interface; and the operations further comprise: receiving the plurality of segments of the media content item via the network interface.

In Example 11, the subject matter of Examples 1-10 includes, wherein the determining whether the segment was signed by the content owner comprises verifying a block on a blockchain.

In Example 12, the subject matter of Examples 1-11 includes, wherein the determining whether the segment was signed by the content owner comprises requesting a verification from a server.

In Example 13, the subject matter of Examples 1-12 includes, wherein the embedded data for each segment is associated with a video coding layer (VCL) of the segment.

In Example 14, the subject matter of Examples 1-13 includes, wherein the causing of the presentation on the display device of the at least one segment of the plurality of segments comprises transmitting the at least one segment to a client device via a network.

In Example 15, the subject matter of Examples 1-14 includes, wherein the operations further comprise: causing presentation on the display device of an indication of whether the segment was signed by the content owner.

Example 16 is a system comprising: one or more processors; a memory that stores instructions that, when executed by the one or more processors, cause the one or more processors to perform operations comprising: accessing a plurality of segments of a media content item, each segment of the plurality of segments comprising embedded data, the media content item indicating a content owner; based on the embedded data for each segment of the plurality of segments, determining that the segment was not signed by the indicated content owner; and based on the segment not being signed by the indicated content owner, refraining from causing presentation on a display device of at least one segment of the plurality of segments.

Example 17 is a method comprising: accessing, by one or more processors, a plurality of segments of a media content item, each segment of the plurality of segments comprising embedded data, the media content item indicating a content owner; based on the embedded data for each segment of the plurality of segments, determining whether the segment was signed by the indicated content owner; and causing presentation on a display device of at least one segment of the plurality of segments.

In Example 18, the subject matter of Example 17 includes, submitting a request to a server, the request comprising an identification of the content owner; and receiving, from the server, a response to the request, the response comprising a decryption key for the content owner; and wherein the determining whether the segment was signed by the content owner comprises decrypting at least a portion of the embedded data of the segment using the decryption key.

In Example 19, the subject matter of Example 18 includes, wherein the determining whether the segment was signed by the content owner further comprises: calculating a hash value of the segment; and comparing the calculated hash value to a hash value stored in the decrypted embedded data.

In Example 20, the subject matter of Example 19 includes, wherein the hash value of the segment is a hash value of a text portion of the segment.

In Example 21, the subject matter of Examples 18-20 includes, wherein: the decrypted embedded data comprises a hash value for a video portion of the media content item; and the determining whether the segment was signed by the content owner comprises determining whether the video portion of the media content item was signed by the content owner.

In Example 22, the subject matter of Example 21 includes, wherein: the video portion of the media content item comprises an instantaneous decode refresh (IDR) frame.

In Example 23, the subject matter of Examples 21-22 includes, wherein: the determining whether the video portion of the media content item was signed by the content owner comprises determining that the video portion of the media content item was not signed by the content owner; and the method further comprises: displaying an indication that the video portion of the segment was not signed by the content owner.

In Example 24, the subject matter of Examples 18-23 includes, wherein: the decrypted embedded data comprises a hash value for an audio portion of the media content item;

and the determining whether the segment was signed by the content owner comprises determining whether the audio portion of the media content item was signed by the content owner.

In Example 25, the subject matter of Example 24 includes, wherein: the determining whether the audio portion of the media content item was signed by the content owner comprises determining that the audio portion of the media content item was not signed by the content owner; and the method further comprises: displaying an indication that the audio portion of the segment was not signed by the content owner.

In Example 26, the subject matter of Examples 17-25 includes, receiving the plurality of segments of the media content item via a network interface.

In Example 27, the subject matter of Examples 17-26 includes, wherein the determining whether the segment was signed by the content owner comprises verifying a block on a blockchain.

In Example 28, the subject matter of Examples 17-27 includes, wherein the determining whether the segment was signed by the content owner comprises requesting a verification from a server.

In Example 29, the subject matter of Examples 17-28 includes, wherein the embedded data for each segment is associated with a video coding layer (VCL) of the segment.

In Example 30, the subject matter of Examples 17-29 includes, wherein the causing of the presentation on the display device of the at least one segment of the plurality of segments comprises transmitting the at least one segment to a client device via a network.

In Example 31, the subject matter of Examples 17-30 includes, causing presentation on the display device of an indication of whether the segment was signed by the content owner.

Example 32 is a method comprising: accessing, by one or more processors, a plurality of segments of a media content item, each segment of the plurality of segments comprising embedded data, the media content item indicating a content owner; based on the embedded data for each segment of the plurality of segments, determining that the segment was not signed by the indicated content owner; and based on the segment not being signed by the indicated content owner, refraining from causing presentation on a display device of at least one segment of the plurality of segments.

Example 33 is a non-transitory machine-readable medium storing instructions that, when executed by one or more processors, cause the one or more processors to perform operations comprising: accessing a plurality of segments of a media content item, each segment of the plurality of segments comprising embedded data, the media content item indicating a content owner; based on the embedded data for each segment of the plurality of segments, determining whether the segment was signed by the indicated content owner; and causing presentation on a display device of at least one segment of the plurality of segments.

In Example 34, the subject matter of Example 33 includes, wherein: the operations further comprise: submitting a request to a server, the request comprising an identification of the content owner; and receiving, from the server, a response to the request, the response comprising a decryption key for the content owner; and the determining whether the segment was signed by the content owner comprises decrypting at least a portion of the embedded data of the segment using the decryption key.

In Example 35, the subject matter of Example 34 includes, wherein the determining whether the segment was signed by the content owner further comprises: calculating a hash value of the segment; and comparing the calculated hash value to a hash value stored in the decrypted embedded data.

In Example 36, the subject matter of Example 35 includes, wherein the hash value of the segment is a hash value of a text portion of the segment.

In Example 37, the subject matter of Examples 34-36 includes, wherein: the decrypted embedded data comprises a hash value for a video portion of the media content item; and the determining whether the segment was signed by the content owner comprises determining whether the video portion of the media content item was signed by the content owner.

In Example 38, the subject matter of Example 37 includes, wherein: the video portion of the media content item comprises an instantaneous decode refresh (IDR) frame.

In Example 39, the subject matter of Examples 37-38 includes, wherein: the determining whether the video portion of the media content item was signed by the content owner comprises determining that the video portion of the media content item was not signed by the content owner; and the operations further comprise: displaying an indication that the video portion of the segment was not signed by the content owner.

In Example 40, the subject matter of Examples 34-39 includes, wherein: the decrypted embedded data comprises a hash value for an audio portion of the media content item; and the determining whether the segment was signed by the content owner comprises determining whether the audio portion of the media content item was signed by the content owner.

In Example 41, the subject matter of Example 40 includes, wherein: the determining whether the audio portion of the media content item was signed by the content owner comprises determining that the audio portion of the media content item was not signed by the content owner; and the operations further comprise: displaying an indication that the audio portion of the segment was not signed by the content owner.

In Example 42, the subject matter of Examples 33-41 includes, wherein: the operations further comprise: receiving the plurality of segments of the media content item via a network interface.

In Example 43, the subject matter of Examples 33-42 includes, wherein the determining whether the segment was signed by the content owner comprises verifying a block on a blockchain.

In Example 44, the subject matter of Examples 33-43 includes, wherein the determining whether the segment was signed by the content owner comprises requesting a verification from a server.

In Example 45, the subject matter of Examples 33-44 includes, wherein the embedded data for each segment is associated with a video coding layer (VCL) of the segment.

In Example 46, the subject matter of Examples 33-45 includes, wherein the causing of the presentation on the display device of the at least one segment of the plurality of segments comprises transmitting the at least one segment to a client device via a network.

In Example 47, the subject matter of Examples 33-46 includes, wherein the operations further comprise: causing presentation on the display device of an indication of whether the segment was signed by the content owner.

Example 48 is a non-transitory machine-readable medium storing instructions that, when executed by one or more processors, cause the one or more processors to perform operations comprising: accessing a plurality of segments of a media content item, each segment of the plurality of segments comprising embedded data, the media content item indicating a content owner; based on the embedded data for each segment of the plurality of segments, determining that the segment was not signed by the indicated content owner; and based on the segment not being signed by the indicated content owner, refraining from causing presentation on a display device of at least one segment of the plurality of segments.

Example 49 is a system comprising: one or more processors; a memory that stores instructions that, when executed by the one or more processors, cause the one or more processors to perform operations comprising: accessing a segment of a media content item, the segment comprising embedded data that indicates a rule regarding modification of the segment; receiving a request to modify the segment in violation of the rule; and based on the request violating the rule, not modifying the segment in accordance with the request.

Example 50 is a method comprising: accessing, by one or more processors, a segment of a media content item, the segment comprising embedded data that indicates a rule regarding modification of the segment; receiving a request to modify the segment in violation of the rule; and based on the request violating the rule, not modifying the segment in accordance with the request.

Example 51 is a non-transitory machine-readable medium that stores instructions that, when executed by one or more processors, cause the one or more processors to perform operations comprising: accessing a segment of a media content item, the segment comprising embedded data that indicates a rule regarding modification of the segment; receiving a request to modify the segment in violation of the rule; and based on the request violating the rule, not modifying the segment in accordance with the request.

Example 52 is at least one machine-readable medium including instructions that, when executed by processing circuitry, cause the processing circuitry to perform operations to implement of any of Examples 1-51.

Example 53 is an apparatus comprising means to implement of any of Examples 1-51.

Example 54 is a system to implement of any of Examples 1-51.

Example 55 is a method to implement of any of Examples 1-51.

The invention claimed is:

1. A system comprising:
one or more processors;
a memory that stores instructions that, when executed by the one or more processors, cause the one or more processors to perform operations comprising:
accessing a plurality of segments of a media content item, each segment of the plurality of segments comprising embedded data in an instantaneous decode refresh (IDR) frame, the media content item indicating a content owner, and the IDR frame including a signature for frames of the media content item beginning with the IDR frame and ending with a frame immediately preceding a next IDR frame in the media content item after the IDR frame;
based on the embedded data for each segment of the plurality of segments, determining whether the signature indicates that the segment was signed by the indicated content owner; and causing presentation on a display device of at least one segment of the plurality of segments when the signature indicates that the at least one segment was signed by the indicated content owner.

2. The system of claim 1, wherein the determining whether the signature indicates that the segment was signed by the indicated content owner comprises:
submitting a request to a server, the request comprising an identification of the content owner; and
receiving, from the server, a response to the request, the response comprising a decryption key for the content owner; and
decrypting at least a portion of the embedded data of the segment using the decryption key to generate decrypted embedded data.

3. The system of claim 2, wherein the determining whether the signature indicates that the segment was signed by the content owner further comprises:
calculating a hash value of the segment; and
comparing the calculated hash value to a hash value stored in the decrypted embedded data.

4. The system of claim 3, wherein the hash value of the segment is a hash value of a text portion of the segment.

5. The system of claim 2, wherein:
the decrypted embedded data comprises a hash value for a video portion of the media content item.

6. The system of claim 5, wherein:
the determining whether the signature indicates that the segment was signed by the content owner comprises determining that the signature indicates that the segment was not signed by the content owner; and
the operations further comprise:
causing presentation on the display device of an indication that the segment was not signed by the content owner.

7. The system of claim 2, wherein:
the decrypted embedded data comprises a hash value for an audio portion of the media content item; and
the determining whether the signature indicates that the segment was signed by the content owner comprises determining whether the signature indicates that the audio portion of the media content item was signed by the content owner.

8. The system of claim 7, wherein:
the determining whether the signature indicates that the audio portion of the media content item was signed by the content owner comprises determining that the audio portion of the media content item was not signed by the content owner; and
displaying an indication that the audio portion of the segment was not signed by the content owner.

9. The system of claim 1, wherein:
the system further comprises a network interface; and
the operations further comprise:
receiving the plurality of segments of the media content item via the network interface.

10. The system of claim 1, wherein the determining whether the signature indicates that the segment was signed by the content owner comprises verifying a block on a blockchain.

11. The system of claim 1, wherein the determining whether the signature indicates that the segment was signed by the content owner comprises requesting a verification from a server.

12. The system of claim 1, wherein the embedded data for each segment of the plurality of segments is associated with a video coding layer (VCL) of the each segment.

13. The system of claim 1, wherein the causing of the presentation on the display device of the at least one segment of the plurality of segments comprises transmitting the at least one segment to a client device via a network.

14. The system of claim 1, wherein the operations further comprise:

causing presentation on the display device of an indication of whether the signature indicates that the segment was signed by the content owner.

15. A system comprising:

one or more processors;

a memory that stores instructions that, when executed by the one or more processors, cause the one or more processors to perform operations comprising:

accessing a plurality of segments of a media content item, each segment of the plurality of segments comprising embedded data in an instantaneous decode refresh (IDR) frame, the media content item indicating a content owner, and the IDR frame including a signature for frames of the media content item beginning with the IDR frame and ending with a frame immediately preceding a next IDR frame in the media content item after the IDR frame;

based on the embedded data for each segment of the plurality of segments, determining that the signature of at least one segment of the plurality of segments indicates that the at least one segment was not signed by the indicated content owner; and based on the at least one segment not being signed by the indicated content owner, refraining from causing presentation on a display device of the at least one segment.

16. A method comprising:

accessing, by one or more processors, a plurality of segments of a media content item, each segment of the plurality of segments comprising embedded data in an instantaneous decode refresh (IDR) frame, the media content item indicating a content owner, and the IDR frame including a signature for frames of the media content item beginning with the IDR frame and ending with a frame immediately preceding a next IDR frame in the media content item after the IDR frame;

based on the embedded data for each segment of the plurality of segments, determining whether the signature indicates that the segment was signed by the indicated content owner; and causing presentation on a display device of at least one segment of the plurality of segments when the signature indicates that the at least one segment was signed by the indicated content owner.

17. The method of claim 16, further comprising:

submitting a request to a server, the request comprising an identification of the content owner; and receiving, from the server, a response to the request, the response comprising a decryption key for the content owner; and wherein the determining whether the signature indicates that the segment was signed by the content owner comprises decrypting at least a portion of the embedded data of the segment using the decryption key to generate decrypted embedded data.

18. The method of claim 17, wherein the determining whether the signature indicates that the segment was signed by the content owner further comprises:

calculating a hash value of the segment; and comparing the calculated hash value to a hash value stored in the decrypted embedded data.

19. The method of claim 18, wherein the hash value of the segment is a hash value of a text portion of the segment.

\* \* \* \* \*